(12) United States Patent
Steinwedel et al.

(10) Patent No.: US 11,250,825 B2
(45) Date of Patent: Feb. 15, 2022

(54) AUDIOVISUAL COLLABORATION SYSTEM AND METHOD WITH SEED/JOIN MECHANIC

(71) Applicant: SMULE, INC., San Francisco, CA (US)

(72) Inventors: David Steinwedel, San Francisco, CA (US); Andrea Slobodien, San Francisco, CA (US); Jeffrey C. Smith, Atherton, CA (US); Perry R. Cook, Jacksonville, OR (US)

(73) Assignee: Smule, Inc., San Francisco, CA (US)

(*) Notice: Subject to any disclaimer, the term of this patent is extended or adjusted under 35 U.S.C. 154(b) by 0 days.

(21) Appl. No.: 16/458,550

(22) Filed: Jul. 1, 2019

(65) Prior Publication Data

US 2019/0355336 A1 Nov. 21, 2019

Related U.S. Application Data

(63) Continuation-in-part of application No. 16/418,659, filed on May 21, 2019, now Pat. No. 10,943,574.

(Continued)

(51) Int. Cl.
*G10H 1/36* (2006.01)
*H04L 12/18* (2006.01)

(52) U.S. Cl.
CPC ......... *G10H 1/361* (2013.01); *H04L 12/1813* (2013.01); *G10H 2210/005* (2013.01); *G10H 2220/011* (2013.01); *G10H 2220/096* (2013.01)

(58) Field of Classification Search
CPC .. G10H 2240/175; G10H 1/368; G10H 1/365; G10H 1/0058; G10H 2240/305; G10H 2210/066; G10H 2220/011; G10H 2240/251; G10H 1/361; G10H 2240/325; G10H 2250/311; G10H 1/0033;
(Continued)

(56) References Cited

U.S. PATENT DOCUMENTS

| | | | |
|---|---|---|---|
| 8,682,653 B2 * | 3/2014 | Salazar | G10H 1/366 340/539.13 |
| 8,779,265 B1 * | 7/2014 | Gottlieb | G10H 1/0033 84/600 |

(Continued)

*Primary Examiner* — Marlon T Fletcher
(74) *Attorney, Agent, or Firm* — Haynes and Boone, LLP

(57) ABSTRACT

User interface techniques provide user vocalists with mechanisms for seeding subsequent performances by other users (e.g., joiners). A seed may be a full-length seed spanning much or all of a pre-existing audio (or audiovisual) work and mixing, to seed further contributions of one or more joiners, a user's captured media content for at least some portions of the audio (or audiovisual) work. A short seed may span less than all (and in some cases, much less than all) of the audio (or audiovisual) work. For example, a verse, chorus, refrain, hook or other limited "chunk" of an audio (or audiovisual) work may constitute a seed. A seeding user's call invites other users to join the full-length or short-form seed by singing along, singing a particular vocal part or musical section, singing harmony or other duet part, rapping, talking, clapping, recording video, adding a video clip from camera roll, etc. The resulting group performance, whether full-length or just a chunk, may be posted, livestreamed, or otherwise disseminated in a social network.

29 Claims, 17 Drawing Sheets

Related U.S. Application Data

(60) Provisional application No. 62/692,129, filed on Jun. 29, 2018, provisional application No. 62/674,460, filed on May 21, 2018.

(58) Field of Classification Search
CPC ....... G10H 2240/066; G10H 2210/005; G10H 2210/101; G10H 2240/171
See application file for complete search history.

(56) References Cited

U.S. PATENT DOCUMENTS

| | | | | |
|---|---|---|---|---|
| 8,868,411 | B2* | 10/2014 | Cook | G10L 21/013 704/207 |
| 9,779,708 | B2* | 10/2017 | Gottlieb | G10H 1/0033 |
| 9,892,758 | B2* | 2/2018 | Leppanen | G11B 27/031 |
| 10,685,634 | B2* | 6/2020 | Salazar | G10L 21/0356 |
| 2003/0164084 | A1* | 9/2003 | Redmann | G10H 1/0058 84/615 |
| 2007/0039449 | A1* | 2/2007 | Redmann | G10H 1/0058 84/609 |
| 2007/0140510 | A1* | 6/2007 | Redmann | G10H 1/0058 381/97 |
| 2008/0040444 | A1 | 2/2008 | Angquist et al. | |
| 2009/0064851 | A1* | 3/2009 | Morris | G10H 1/383 84/637 |
| 2010/0281375 | A1* | 11/2010 | Pendergast | G11B 27/34 715/723 |
| 2010/0304812 | A1 | 12/2010 | Stoddard et al. | |
| 2011/0011243 | A1* | 1/2011 | Homburg | G10H 1/40 84/612 |
| 2011/0011244 | A1* | 1/2011 | Homburg | G10H 7/04 84/612 |
| 2011/0011245 | A1* | 1/2011 | Adam | G10L 21/04 84/612 |
| 2011/0011246 | A1* | 1/2011 | Buskies | G10H 1/38 84/613 |
| 2011/0015766 | A1* | 1/2011 | Gehring | G10H 1/0066 700/94 |
| 2011/0015767 | A1* | 1/2011 | Homburg | G10H 1/0066 700/94 |
| 2011/0016393 | A1* | 1/2011 | Gerteis | G06F 12/023 715/716 |
| 2011/0016425 | A1* | 1/2011 | Homburg | G06F 3/0482 715/811 |
| 2011/0144981 | A1* | 6/2011 | Salazar | G10H 1/368 704/207 |
| 2011/0144983 | A1* | 6/2011 | Salazar | G10H 1/366 704/207 |
| 2011/0175915 | A1* | 7/2011 | Gehring | H03G 5/165 345/440 |
| 2011/0247480 | A1* | 10/2011 | Gehring | G10H 1/383 84/613 |
| 2011/0251840 | A1* | 10/2011 | Cook | G10L 13/0335 704/207 |
| 2011/0307084 | A1* | 12/2011 | Gehring | G10H 3/125 700/94 |
| 2013/0132839 | A1* | 5/2013 | Berry | G11B 27/031 715/719 |
| 2013/0262999 | A1 | 10/2013 | Hwang et al. | |
| 2014/0039883 | A1* | 2/2014 | Yang | G10H 1/366 704/207 |
| 2015/0255082 | A1 | 9/2015 | Cook et al. | |
| 2016/0036962 | A1* | 2/2016 | Rand | H04M 1/72563 455/418 |
| 2016/0057316 | A1* | 2/2016 | Godfrey | G10L 13/0335 348/515 |
| 2016/0156731 | A1 | 6/2016 | Wang et al. | |
| 2016/0234345 | A1* | 8/2016 | Roberts, Jr. | H04L 67/306 |
| 2016/0358595 | A1* | 12/2016 | Sung | G10H 1/368 |
| 2017/0123755 | A1* | 5/2017 | Hersh | H04M 1/72412 |
| 2017/0124999 | A1* | 5/2017 | Hersh | H04N 21/233 |
| 2018/0018898 | A1 | 1/2018 | Humphrey | |
| 2018/0286462 | A1 | 10/2018 | Becherer et al. | |
| 2018/0288467 | A1* | 10/2018 | Holmberg | H04N 21/2187 |
| 2018/0308462 | A1 | 10/2018 | Wang | |
| 2018/0374462 | A1* | 12/2018 | Steinwedel | G10H 1/366 |
| 2019/0035372 | A1 | 1/2019 | Yoelin | |
| 2019/0259360 | A1* | 8/2019 | Yoelin | G10H 1/365 |
| 2019/0266987 | A1* | 8/2019 | Yang | G10L 21/013 |
| 2019/0306540 | A1* | 10/2019 | Holmberg | H04N 21/4394 |
| 2019/0354272 | A1* | 11/2019 | Steinwedel | G06F 3/04883 |
| 2019/0355336 | A1* | 11/2019 | Steinwedel | G10H 1/368 |
| 2019/0355337 | A1* | 11/2019 | Steinwedel | H04N 21/42203 |
| 2020/0135237 | A1* | 4/2020 | Gauvin | G06F 16/638 |

* cited by examiner

AUDIOVISUAL COLLABORATION SYSTEM AND METHOD WITH SEED/JOIN MECHANIC

CROSS-REFERENCE TO RELATED APPLICATION(S)

The present application is a continuation-in-part of U.S. application Ser. No. 16/418,659, entitled "NON-LINEAR MEDIA SEGMENT CAPTURE AND EDIT PLATFORM," naming Steinwedel, Slobodien, Smith and Cook as inventors, filed May 21, 2019, which in-turn claims priority under 35 U.S.C. § 119(e) of U.S. Application Nos.: 62/674,460 and 62/692,129. The present application also claims priority under 35 U.S.C. § 119(e) of U.S. Application No. 62/692,129, filed Jun. 29, 2018. Each of the foregoing applications is incorporated by reference herein.

BACKGROUND

Field of the Invention

The inventions relate generally to capture and/or processing of audiovisual performances and, in particular, to user interface techniques suitable for capturing and manipulating media segments encoding audio and/or visual performances for use in a seed and join collaboration mechanic with options for non-linear capture, recapture, overdub or lip-sync.

Description of the Related Art

The installed base of mobile phones, personal media players, and portable computing devices, together with media streamers and television set-top boxes, grows in sheer number and computational power each day. Hyper-ubiquitous and deeply entrenched in the lifestyles of people around the world, many of these devices transcend cultural and economic barriers. Computationally, these computing devices offer speed and storage capabilities comparable to engineering workstation or workgroup computers from less than ten years ago, and typically include powerful media processors, rendering them suitable for real-time sound synthesis and other musical applications. Indeed, some modern devices, such as iPhone®, iPod Touch® and other iOS® or Android devices, support audio and video processing quite capably, while at the same time providing platforms suitable for advanced user interfaces.

Applications such as the Smule Ocarina™, Leaf Trombone®, I Am T-Pain™, AutoRap®, Smule (fka Sing! Karaoke™), Guitar! By Smule®, and Magic Piano® apps available from Smule, Inc. have shown that advanced digital acoustic techniques may be delivered using such devices in ways that provide compelling musical experiences. As researchers seek to transition their innovations to commercial applications deployable to modern handheld devices and media application platforms within the real-world constraints imposed by processor, memory and other limited computational resources thereof and/or within communications bandwidth and transmission latency constraints typical of wireless networks, significant practical challenges continue to present. Improved techniques and functional capabilities are desired, particularly relative to audiovisual content and user interfaces.

SUMMARY

It has been discovered that, despite practical limitations imposed by mobile device platforms and media application execution environments, audiovisual performances, including vocal music, may be captured and coordinated with audiovisual content, including performances of other users, in ways that create compelling user experiences. In some cases, the vocal performances of individual users are captured (together with performance synchronized video) on mobile devices in the context of a karaoke-style presentation of lyrics in correspondence with audible renderings of a backing track. For example, performance capture can be facilitated using user interface designs whereby a user vocalist is visually presented with lyrics and pitch cues and whereby a temporally synchronized audible rendering of an audio backing track is provided. Exemplary techniques, including exemplary techniques for capture, coordination and mixing of audiovisual content for geographically distributed performers, are detailed in commonly-owned U.S. Pat. No. 9,866,731, filed Oct. 30, 2015, entitled "COORDINATING AND MIXING AUDIOVISUAL CONTENT CAPTURED FROM GEOGRAPHICALLY DISTRIBUTED PERFORMERS," the entirety of which is incorporated herein by reference.

Building on these and related techniques, user interface improvements are envisioned to provide user vocalists with mechanisms for seeding subsequent performances by other users (e.g., joiners). In some cases, a seed may be a full-length seed spanning much or all of a pre-existing audio (or audiovisual) work and mixing, to seed further the contributions of one or more joiners, a user's captured media content for at least some portions of the audio (or audiovisual) work. In some cases, a short seed may be employed spanning less than all (and in some cases, much less than all) of the audio (or audiovisual) work. For example, a verse, chorus, refrain, hook or other limited "chunk" of an audio (or audiovisual) work may constitute a seed in some cases or embodiments. Whatever the extent or scope of the seed, a seeding user may ask (or call) others to join. Typically, a call invites other users to join the full-length or short form seed by singing along, singing a particular vocal part or musical section, singing harmony or other duet part, rapping, talking, clapping, recording video, adding a video clip from camera roll, etc. The resulting group performance, whether full-length or just a chunk, may be posted, livestreamed, or otherwise disseminated in a social network.

A seed or seed portion may be selected by the seeding user using scrubbing techniques that allow forward and backward traversal of audiovisual content, optionally including pitch cues, waveform- or envelope-type performance timelines, lyrics, video and/or other temporally-synchronized content at record-time, during edits, and/or in playback. In this way, recapture of selected performance portions, coordination of group parts, and overdubbing may all be facilitated. Direct scrolling to arbitrary points in the performance timeline, lyrics, pitch cues and other temporally-synchronized content allows user to conveniently move through a capture or audiovisual edit session. For selections or embodiments that involve short seeds, scrubbing techniques may be employed to define start and stop points that delimit a particular seed portion or chunk. Likewise, in the case of full-length seeds, scrubbing techniques may be employed to define start and stop points that delimit portions of a performance timeline to which a joiner is invited to contribute. In some cases, the user vocalist may be guided through the performance timeline, lyrics, pitch cues and other temporally-synchronized content in correspondence with group part information such as in a guided short-form capture for a duet. In some or all of the cases, a scrubber allows user vocalists to conveniently move forward and backward through the temporally-synchronized content. In some cases, temporally synchronized video capture and/or playback is also supported in connection with the scrubber. Note that while scrubbing may be provided for synchronized traversal of multiple media lines (e.g., backing audio, vocals, lyrics, pitch cue and/or group part information), single-medium scrubbing is also envisioned.

Scrubbing techniques need not be employed in all cases or embodiments. In some cases or embodiments, portions of a performance timeline (often portions that correspond to musical sections) may be marked and labelled for user selection. Marking/labeling may be based on human or automated sources. For example, particular portions may be marked or labelled by a user that originally uploads a track or corresponding lyrics or by a media content curator. In a complementary fashion or alternatively, particular portions may be marked or labelled by a machine learning robot trained to identify section and boundaries (e.g., from an audio backing or vocal track, lyrics or based on crowd-sourced data such as where user tend to sing the most or most loudly).

In addition to user interface and platform features designed to facilitate non-linear media segment capture and edit, it is envisioned that collaboration features may be provided to allow users to contribute media content and/or other temporally synchronized information to an evolving performance timeline. To facilitate collaboration and/or accretion of content, a shared service platform may expose media content and performance timeline data as a multi-user concurrent access database. Alternatively or additionally, particularly once a performance timeline has been at least partially defined with seed audio or video, collaboration may be facilitated through posting (e.g., via the shared service platform or otherwise in a peer-to-peer manner) of the performance timeline for joins by additional users who may, in turn, capture, edit and accrete to the performance timeline additional media segments, lyric information, pitch tracks, vocal part designations, and/or media segment-based or performance/style/genre-mapped audio or video effects/filters. In some cases, additional captures, edits and accretions to the performance timeline are accomplished using the user interface and platform features described herein to facilitate non-linear media segment capture and edit of audiovisual content and data for karaoke-style performances.

These and other user interface improvements will be understood by persons of skill in the art having benefit of the present disclosure in connection with other aspects of an audiovisual performance capture system. Optionally, in some cases or embodiments, vocal audio can be pitch-corrected in real-time at the mobile device (or more generally, at a portable computing device such as a mobile phone, personal digital assistant, laptop computer, notebook computer, pad-type computer or netbook) or on a content or media application server in accord with pitch correction settings. In some cases, pitch correction settings code a particular key or scale for the vocal performance or for portions thereof. In some cases, pitch correction settings include a score-coded melody and/or harmony sequence supplied with, or for association with, the lyrics and backing tracks. Harmony notes or chords may be coded as explicit targets or relative to the score coded melody or even actual pitches sounded by a vocalist, if desired.

Based on the compelling and transformative nature of the pitch-corrected vocals, performance synchronized video and score-coded harmony mixes, user/vocalists may overcome an otherwise natural shyness or angst associated with sharing their vocal performances. Instead, even geographically distributed vocalists are encouraged to share with friends and family or to collaborate and contribute vocal performances as part of social music networks. In some implementations, these interactions are facilitated through social network- and/or eMail-mediated sharing of performances and invitations to join in a group performance. In some implementations, livestreaming may be supported. Living room-style, large screen user interfaces may facilitate these interactions. Using uploaded vocals captured at clients such as the aforementioned portable computing devices, a content server (or service) can mediate such coordinated performances by manipulating and mixing the uploaded audiovisual content of multiple contributing vocalists. Depending on the goals and implementation of a particular system, in addition to video content, uploads may include pitch-corrected vocal performances (with or without harmonies), dry (i.e., uncorrected) vocals, and/or control tracks of user key and/or pitch correction selections, etc.

Social music can be mediated in any of a variety of ways. For example, in some implementations, a first user's vocal performance, captured against a backing track at a portable computing device and typically pitch-corrected in accord with score-coded melody and/or harmony cues, is supplied to other potential vocal performers as a seed. Performance synchronized video is also captured and may be supplied with the pitch-corrected, captured vocals. The supplied vocals are mixed with backing instrumentals/vocals and form the backing track for capture of a second user's vocals. Often, successive vocal contributors are geographically separated and may be unknown (at least a priori) to each other, yet the intimacy of the vocals together with the collaborative experience itself tends to minimize this separation. As successive vocal performances and video are captured (e.g., at respective portable computing devices) and accreted as part of the social music experience, the backing track against which respective vocals are captured may evolve to include previously captured vocals of other contributors.

In some cases, a complete performance, or a complete performance of a particular vocal part (e.g., Part A or B in duet), may constitute the seed for a social music collaboration. However, using techniques described herein, capture of even small or isolated portions of an overall performance, e.g., a refrain, hook, intro, outro, duet or group part, verse or other limited portion, section or select selected segment of a larger performance may be conveniently captured, re-captured, or edited for use as a collaboration seed, regardless of whether it constitutes a complete performance timeline. In some cases, select sections, locations or pre-marked/labeled segment boundaries may correspond to elements of musical structure. As a result, embodiments in accordance with the present invention(s) may facilitate "small seed" collaboration mechanics in a social music network of geographically distributed performers.

In some cases, captivating visual animations and/or facilities for listener comment and ranking, as well as duet, glee club or choral group formation or accretion logic are provided in association with an audible rendering of a vocal performance (e.g., that captured and pitch-corrected at another similarly configured mobile device) mixed with backing instrumentals and/or vocals. Synthesized harmonies and/or additional vocals (e.g., vocals captured from another vocalist at still other locations and optionally pitch-shifted to harmonize with other vocals) may also be included in the mix. Audio or visual filters or effects may be applied or reapplied post-capture for dissemination or posting of content. In some cases, disseminated or posted content may take the form of a collaboration request or open call for additional vocalists. Geocoding of captured vocal performances (or individual contributions to a combined performance) and/or listener feedback may facilitate animations or display artifacts in ways that are suggestive of a performance or endorsement emanating from a particular geographic locale on a user-manipulable globe. In these ways, implementations of the described functionality can transform otherwise mundane mobile devices and living room or entertainment systems into social instruments that foster a unique sense of global connectivity, collaboration and community.

In some embodiments in accordance with the present invention(s), a system includes first and second media capture devices communicatively coupled via respective network communication interfaces for multi-performer collaboration relative to a baseline media encoding of an audio work. The first media capture device provides a first user thereof with a user interface for selecting a seed portion of the audio work and is configured to capture at least vocal audio of the first user performed against an audible rendering on the first media capture device of at least a portion of the audio work. The second media capture device is configured (i) to receive, via its network communications interface, an indication of the seed portion selected by the first user at the first media capture device and (ii) to capture media content of a second user performed against an audible rendering on the second media capture device of the seed portion mixed with the captured vocal audio of the first user.

In some cases or embodiments, the user interface of the first media capture device further allows the first user to specify one or more types of media content to be captured from the second user's performance against the audible rendering on the second media capture device of the seed portion mixed with the captured vocal audio of the first user. In some cases or embodiments, the specified one or more types of media content to be captured are selected from a set that includes: vocal audio, vocal harmony or a vocal duet part; rap, talk, clap or percussion; and video. In some cases or embodiments, the user interface of the first media capture device further allows the first user to post the seed portion to other geographically-distributed users, including the second user, and media capture devices as a collaboration request for capture and addition of further vocal audio, video or performance synchronized audiovisual content.

In some embodiments, the system further includes a service platform communicatively coupled to the first and second media capture devices, the service platform configured to supply, for audible or audiovisual rendering on at least a third communicatively coupled device, a media encoding of a multi-performer collaboration of at least the first and second users based on the audio work but temporally limited to the seed portion thereof selected by the first user.

In some embodiments, the system further includes, on the first media capture device, a media content scrubber by which the first user notates start and stop points in a performance timeline to delimit and thereby select the seed portion. In some cases or embodiments, the media content scrubber presents to the first user a temporally-synchronized representation of two or more of: audio envelope for backing audio and/or vocals; lyrics; one or more pitch tracks; and duet or other group part notations.

In some embodiments, the system further includes, on the first media capture device, a user interface by which the first user selects the seed portion from amongst pre-marked or labeled portions of the audio work. In some cases or embodiments, the pre-marked or labeled portions of the audio work are supplied by a service platform communicatively coupled to the first and second media capture devices, the pre-marked or labeled portions having been marked or labelled based on one or more of: musical structure coded for the audio work; a machine learning algorithm applied to backing audio, vocal audio or lyrics of or corresponding to the audio work; crowd-sourced data; and data supplied by a user uploader of the audio work or by a third-party curator thereof.

In some cases or embodiments, the baseline media encoding of the audio work further encodes synchronized video content. In some cases or embodiments, the first media capture device is further configured to capture performance synchronized video content. In some cases or embodiments, the first and second media capture device are mobile phone-type portable computing devices executing application software that, in at least one operating mode thereof, provide a karaoke-style presentation of a performance timeline including lyrics on a multi-touch sensitive display thereof in temporal correspondence with audible rendering of the audio work and that captures the respective first or second user's vocal and/or performance synchronized video via on-board audio and video interfaces the respective mobile phone-type portable computing device.

In some embodiments in accordance with the present invention(s), a method includes using a portable computing device for media segment capture in connection with karaoke-style presentation of a performance timeline on a multi-touch sensitive display thereof, the performance timeline including lyric and pitch tracks synchronized with an audio track. The method further includes, responsive to gesture control on the multi-touch sensitive display, designating a subset of the lyrics to a joiner; and posting the performance timeline, with the lyrics subset designation, as a collaboration request for capture and addition of further vocal audio content by a joining remote user on a second, remote portable computing device that is configured for further media segment capture in connection with the performance timeline. In some cases or embodiments, the portable computing device is configured with user interface components executable to provide (i) start/stop control of the media segment capture and (ii) a scrubbing interaction for temporal position control within the performance timeline.

In some embodiments, the method further includes adding at least one media segment to the performance timeline beginning at a scrubbed-to first position in the performance timeline that is neither the beginning thereof nor a most recent stop or pause position within the performance timeline. In some embodiments, the method further includes capturing vocal audio at the portable computing device beginning at the scrubbed-to first position in the performance timeline and in correspondence with the karaoke-style presentation of at least the synchronized lyric and pitch tracks on the multi-touch sensitive display, wherein the added at least one media segment includes the captured vocal audio.

In some cases or embodiments, the added at least one media segment includes one or more of: video or still images; video captured at the portable computing device beginning at the scrubbed-to first position in the performance timeline and in correspondence with the karaoke-style presentation of the lyric and pitch tracks on the multi-touch sensitive display and synchronized audible rendering of the audio track; and performance synchronized audio and visual media content captured at the portable computing device.

In some embodiments, the method further includes saving the performance timeline, including the added at least one media segment, to a network-coupled service platform. In some embodiments, the method further includes retrieving a previously saved version of the performance timeline from a network-coupled service platform.

In some cases or embodiments, the posting of the performance timeline for the joining remote user is via a network-coupled service platform. In some cases or embodiments, the lyrics subset designation is responsive to a first user gesture control on the multi-touch sensitive display that selects a particular vocal part for the joiner. In some cases or embodiments, the lyrics subset designation is responsive to a second user gesture control on the multi-touch sensitive display that delimits the subset of the lyrics that correspond to the joiner's further media segment.

In some embodiments in accordance with the present invention(s), a method includes using a first portable computing device for media segment capture in connection with karaoke-style presentation of a performance timeline on a multi-touch sensitive display thereof, the performance timeline including lyric and pitch tracks synchronized with an audio track, wherein the performance timeline includes a subset of the lyrics designated by a prior user on a second remote computing device, the lyric subset designation at least partially parameterizing a collaboration request for capture and addition of further vocal audio content by a performance timeline-joining user on the first portable computing device. In some cases or embodiments, the first portable computing device is configured with user interface components executable to provide (i) start/stop control of the media segment capture and (ii) a scrubbing interaction for temporal position control within the performance timeline.

In some embodiments, the method further includes capturing at least one vocal audio media segment beginning at a scrubbed-to first position in the performance timeline that is neither the beginning thereof nor a most recent stop or pause position within the performance timeline. In some embodiments, the method further includes updating the performance timeline to include the captured at least one vocal audio media segment; and posting of the updated performance timeline via a network-coupled service platform for a joining remote user.

In some cases or embodiments, the lyrics subset designation is selective for a particular vocal part. In some cases or embodiments, the lyrics subset designation delimits a subset of the lyrics for the performance timeline-joining user's further vocal audio content.

In some embodiments in accordance with the present invention(s), a method includes using a portable computing device for capture of media content for a karaoke-style presentation of synchronized lyric, pitch and audio tracks; capturing at least one audio segment using the portable computing device on a multi-touch sensitive display thereof, the portable computing device configured with user interface components executable to provide (i) start/stop control of the media segment capture and (ii) a scrubbing interaction for temporal position control within a performance timeline; entering one or more segments of the lyrics and aligning the entered lyric segments to the performance timeline in response to first user gesture controls on the multi-touch sensitive display; responsive to a second user gesture control on the multi-touch sensitive display moving forward or backward through a visually synchronized presentation, on the multi-touch sensitive display, of the performance timeline; and after the moving, capturing at least one audio segment and pitch detecting the captured audio segment to produce at least a portion of the pitch track.

In some cases or embodiments, the capture of at least one audio segment is freestyle, without roll of the lyrics or pitch tracks. In some cases or embodiments, the captured freestyle audio segment includes performance synchronized video. In some cases or embodiments, the captured freestyle audio segment includes either or both of: instrumental backing audio; and vocal audio.

In some embodiments, the method further includes, responsive to a third user gesture control on the multi-touch sensitive display, moving forward or backward through a visually synchronized presentation, on the multi-touch sensitive display, of the performance timeline; and after the moving, designating a subset of the lyrics to first vocal part. In some embodiments, the method further includes posting the performance timeline as a collaboration request for capture and addition of vocal audio content by one or more vocalists at remote portable computing devices.

BRIEF DESCRIPTION OF THE DRAWINGS

The present invention(s) are illustrated by way of examples and not limitation with reference to the accompanying figures, in which like references generally indicate similar elements or features.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to improve understanding of embodiments of the present invention.

DETAILED DESCRIPTION

Techniques have been developed to facilitate the capture, pitch correction, compositing, encoding and rendering of audiovisual performances. Vocal audio together with performance synchronized video may be captured and coordinated with audiovisual contributions of other users to form multi-performer, duet-style or glee club-style audiovisual performances. Nonlinear capture and/or edit of individual segments or portions of a performance timeline allows freeform collaboration of multiple contributors, typically with independent and geographically-distributed audio and/or video capture. In some cases, audio and video may be separately captured and associated after capture. In some cases, the performances of individual users (audio, video or, in some cases, audio together with performance synchronized video) are captured on mobile devices, television-type display and/or set-top box equipment in the context of karaoke-style presentations of lyrics in correspondence with audible renderings of a backing track or vocal performance. Captured audio, video or audiovisual content of one contributor may serve as a seed for a group performance.

Karaoke-Style Vocal Performance Capture

Figure 1:
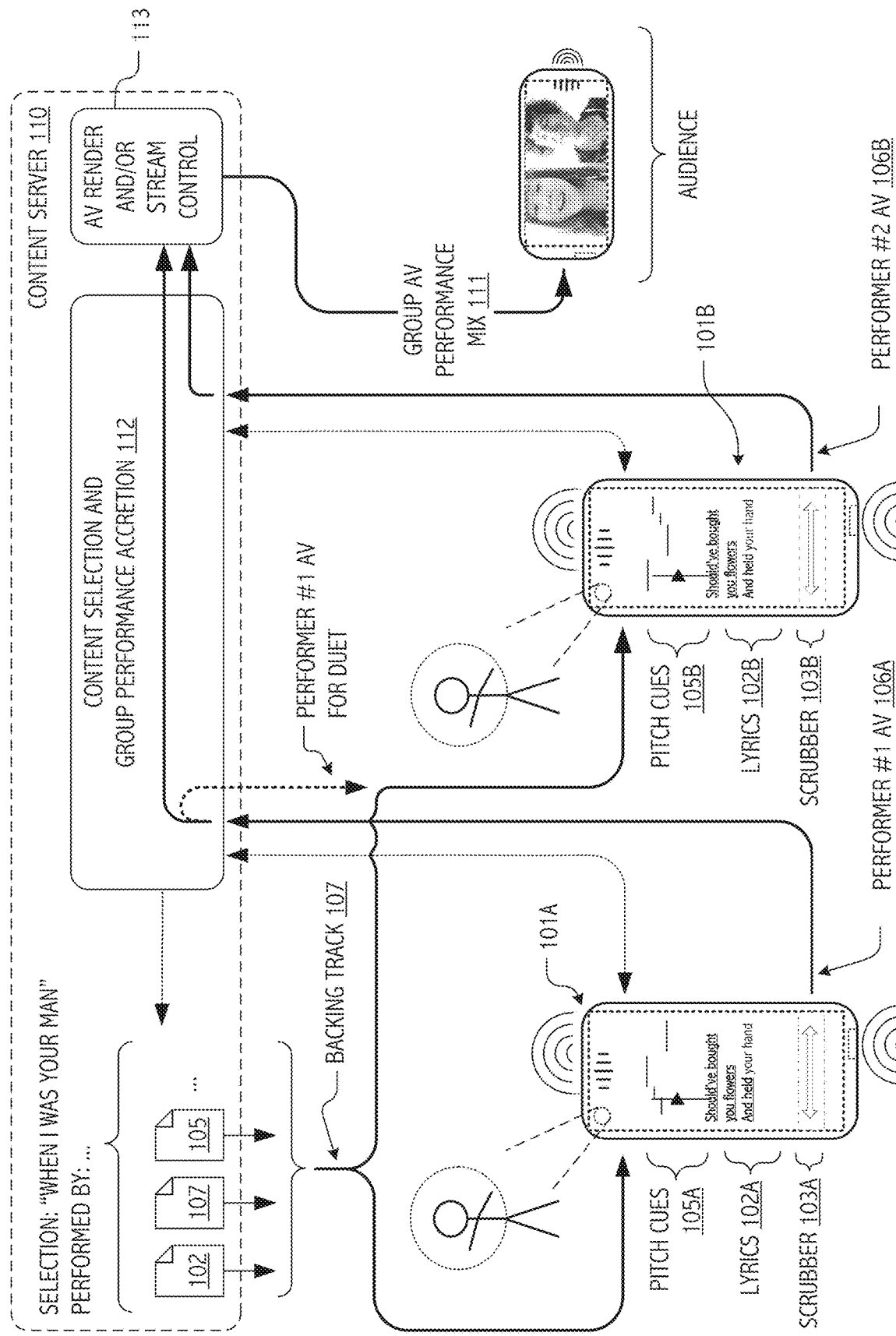
FIG. 1 depicts information flows amongst illustrative mobile phone-type portable computing devices employed for non-linear audiovisual capture and/or edit in preparation of a group audiovisual performance in accordance with some embodiments of the present invention(s).

FIG. 1 depicts information flows amongst illustrative mobile phone-type portable computing devices (101A, 101B) and a content server 110 in accordance with some embodiments of the present invention(s). In the illustrated flows, lyrics 102, pitch cues 105 and a backing track 107 are supplied to one or more of the portable computing devices (101A, 101B) to facilitate vocal (and in some cases, audiovisual) capture. User interfaces of the respective devices provide a scrubber (103A, 103B), whereby a given user-vocalist is able to move forward and backward through temporally synchronized content (e.g., audio, lyrics, pitch cues, etc.) using gesture control on a touchscreen. In some cases, scrubber control also allows forward and backward movement through performance-synchronized video.

Although embodiments of the present invention are not limited thereto, pitch-corrected, karaoke-style, vocal capture using mobile phone-type provides a useful descriptive context. For example, in some embodiments consistent with that illustrated in FIG. 1, an iPhone™ handheld available from Apple Inc. (or more generally, a portable computing device 101A, 101B) hosts software that executes in coordination with a content server 110 to provide vocal capture, often with continuous real-time, score-coded pitch correction and/or harmonization of the captured vocals. Performance synchronized (or performance-synchronizable) video may be captured using a camera provided using an on-board camera. In some embodiments, audio, video and/or audiovisual content may be captured using, or in connection with, a camera or cameras configured with a television (or other audiovisual equipment) or connected set-top box equipment (not specifically shown in FIG. 1). In some embodiments, traditional desk/laptop computers may be appropriately configured and host an application or web application to support some of the functions described herein.

Capture of a two-part performance is illustrated (e.g., as a duet in which audiovisual content 106A and 106B is separately captured from individual vocalists); however, persons of skill in the art having benefit of the present disclosure will appreciate that techniques of the present invention may also be employed in solo and in larger multipart performances. In general, audiovisual content may be posted, streamed, or may initiate or be captured in response to a collaboration request. In the illustrated embodiment, content selection, group performances and dissemination of captured audiovisual performances are all coordinated via content server 110. A content selection and performance accretion module 112 of content server 110 performs audio mixing and video stitching in the illustrated design, while audiovisual render/stream control module 113 supplies group audiovisual performance mix 111 to a downstream audience. In other embodiments, peer-to-peer communications may be employed for at least some of the illustrated flows.

In some cases, a wireless local area network may support communications between a portable computing device 101A instance, audiovisual and/or set-top box equipment, and a wide-area network gateway (not specifically shown) that, in turn, communicates with a remote device 101B and/or content server 110. Although FIG. 1 depicts a configuration in which content server 110 plays an intermediating role between portable computing devices 101A and 101B, persons of skill in the art having benefit of the present disclosure will appreciate that peer-to-peer or host-to-guest communication between portable computing devices 101A and 101B may also, or alternatively, be supported. Persons of skill in the art will recognize that any of a variety of data communications facilities, including 802.11 Wi-Fi, Bluetooth™, 4G-LTE, 5G, or other communications, wireless, wired data networks, and/or wired or wireless audiovisual interconnects may be employed, individually or in combination, to facilitate communications and/or audiovisual rendering described herein.

As is typical of karaoke-style applications (such as the Smule app available from Smule, Inc.), a backing track of instrumentals and/or vocals can be audibly rendered for a user/vocalist to sing against. In such cases, lyrics may be displayed (102A, 102B) in correspondence with local audible rendering to facilitate a karaoke-style vocal performance by a given user. Note that, in general, individual users may perform the same or different parts in a group performance and that audio or audiovisual captures need not be, and typically are not, simultaneous. In some embodiments, audio or audiovisual capture of performer contributions may be independent and asynchronous, often spanning time zones and continents. However, in some embodiments, live streaming techniques may be employed. In the illustrated configuration of FIG. 1, lyrics, timing information, pitch and harmony cues, backing tracks (e.g., instrumentals/vocals), performance coordinated video, etc. may all be sourced from a network-connected content server 110. In some cases or situations, backing audio and/or video may be rendered from a media store such as a music library that is resident or accessible from the handheld, set-top box, content server, etc.

User vocal or audiovisual content 106A, 106B is captured at respective devices 101A, 101B, optionally pitch-corrected continuously and in real-time (either at the handheld or using computational facilities of audiovisual display and/or set-top box equipment not specifically shown) and audibly rendered to provide the user with an improved tonal quality rendition of his/her own vocal performance. Pitch correction is typically based on score-coded note sets or cues (e.g., pitch and harmony cues 105), which provide continuous pitch-correction algorithms with performance synchronized sequences of target notes in a current key or scale. In addition to performance synchronized melody targets, score-coded harmony note sequences (or sets) provide pitch-shifting algorithms with additional targets (typically coded as offsets relative to a lead melody note track and typically scored only for selected portions thereof) for pitch-shifting to harmony versions of the user's own captured vocals. In some embodiments, note/pitch targets and score-coded timing information may be used to evaluate vocal performance quality.

Lyrics 102, melody and harmony track note sets 105 and related timing and control information may be encapsulated in an appropriate container or object (e.g., in a Musical Instrument Digital Interface, MIDI, or Java Script Object Notation, json, type format) for supply together with the backing track 107. Using such information, portable computing devices 101A, 101B may display lyrics (102A, 102B) and even visual cues (105A, 105B) related to target notes, harmonies and currently detected vocal pitch in correspondence with an audible performance of the backing track(s) so as to facilitate a karaoke-style vocal performance by a user. Thus, if an aspiring vocalist selects "When I Was Your Man" as popularized by Bruno Mars, your_man.json and your_man.m4a may be downloaded from the content server (if not already available or cached based on prior download) and, in turn, used to provide background music, synchronized lyrics and, in some situations or embodiments, score-coded note tracks for continuous, real-time pitch-correction while the user sings. Optionally, at least for certain embodiments or genres, harmony note tracks may be score coded for harmony shifts to captured vocals.

Typically, a captured pitch-corrected (possibly harmonized) vocal performance together with performance synchronized video is saved locally, on the handheld device or set-top box, as one or more audio or audiovisual files and is subsequently compressed and encoded for upload (106A, 106B) to content server 110 as MPEG-4 container files. While MPEG-4 is an exemplary standard for the coded representation and transmission of digital multimedia content for the Internet, mobile networks and advanced broadcast applications, other suitable codecs, compression techniques, coding formats and/or containers may be employed, if desired. Depending on the implementation, encodings of dry vocal and/or pitch-corrected vocals may be uploaded (106A, 106B) to content server 110. In general, such vocals (encoded, e.g., in an MPEG-4 container or otherwise) whether already pitch-corrected or pitch-corrected at content server 110 can then be mixed, e.g., with backing audio and other captured (and possibly pitch shifted) vocal performances, to produce files or streams of quality or coding characteristics selected accord with capabilities or limitations a particular target or network. In some embodiments, audio processing and mixing and/or video synchronization and stitching to provide a composite, multi-performer, audiovisual work may be performed at a server or service platform such as content server 110.

Non-Linear Segment Capture and/or Edit

Figure 2:
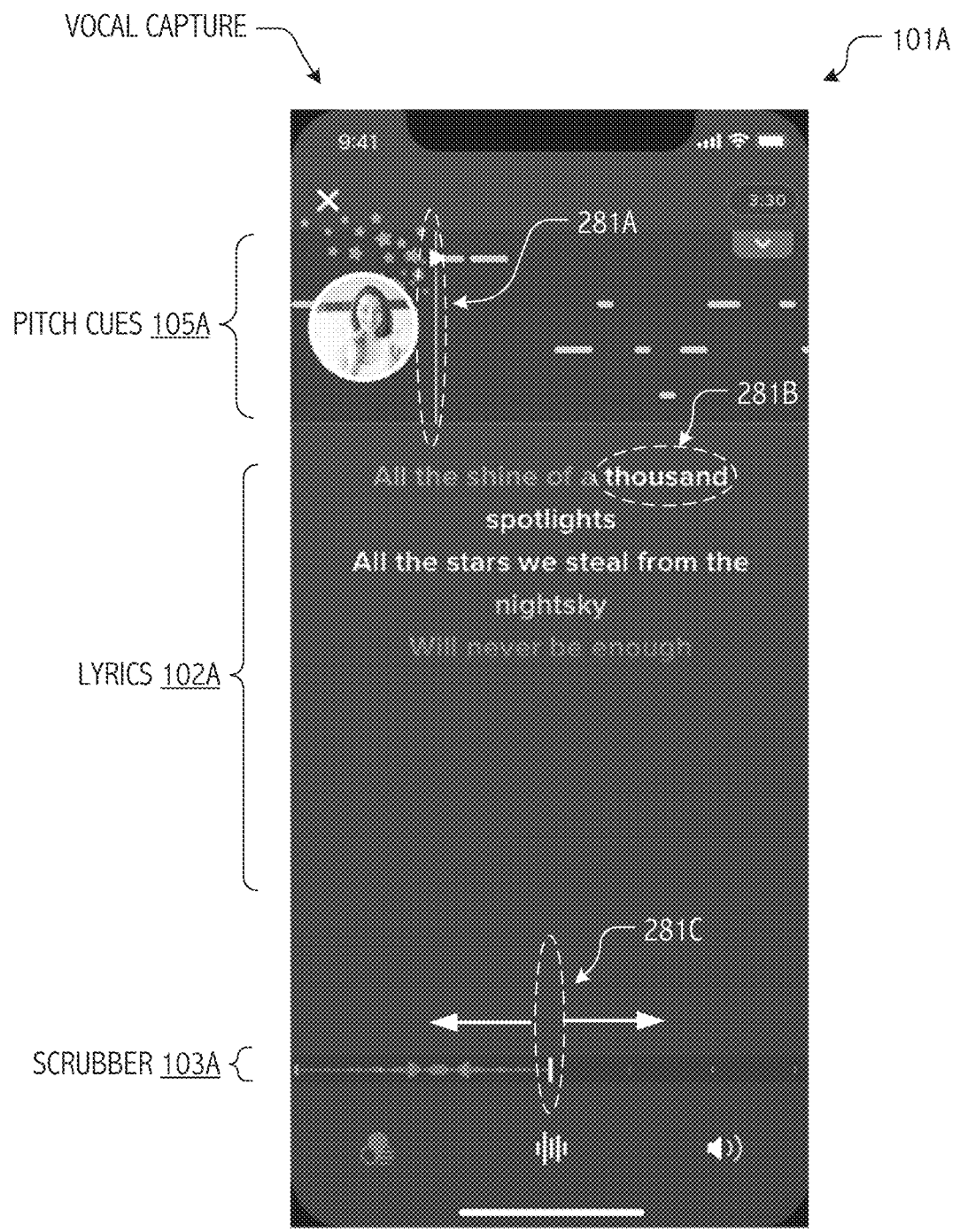
FIG. 2 depicts in somewhat greater detail an exemplary user interface with visually synchronized presentation of lyrics, pitch cues and a scrubber in connection with a vocal capture session on portable computing device.

FIG. 2 depicts in somewhat greater detail an exemplary user interface presentation of lyrics 102A, pitch cues 105A and a scrubber 103A in connection with a vocal capture session on portable computing device 101A (recall FIG. 1). A current vocal capture point is notated (281A, 281B, 281C) in multiple frames of reference (e.g., in lyrics 102A, in pitch cues 105A and in the audio envelope depiction of a performance timeline in scrubber 103A). Any of a variety of notation techniques or symbology may be employed. In general, particular forms of user interface notation and symbology are matters of design choice, but may include color cues (such as for word, line or syllable position 281B in lyrics 102A), vertical or horizontal bar markers (see notations 281A, 281C in pitch cue 105A and scrubber 103A portions of the FIG. 2 user interface presentation), or otherwise.

As will be understood with reference to subsequent drawings and description, the exemplary user interface presentation of FIG. 2 (and variations thereon) provides a mechanism whereby the user may move forward or backward in a performance timeline based on on-screen gesture control. By manipulating a current position 281C forward or backward in scrubber 103A, vocal capture point is correspondingly moved forward or backward in the performance timeline. Correspondingly, lyrics 102A and pitch cues 105A advance or rewind in a visually synchronized manner. Likewise, position in backing tracks and/or captured audio, video or audiovisual content is advanced or rewound. In this way, an on-screen user interface manipulation by the user of portable computing device 101A moves forward or backward and facilitates non-linear traversal of the performance timeline. For example, rather than starting vocal, video or audiovisual capture at the beginning of a performance timeline or resuming at a most recent stop or pause position, the user may move forward or backward to an arbitrary point in the performance timeline. Re-recording, overdubbing, and/or selectively capturing only particular sections or portions of a performance are all facilitated by the provided non-linear access. In some embodiments, non-linear access allows audio and video to be captured in separate passes.

A current position 281C in scrubber 103A, which is visually presented as an audio envelope of the performance timeline, is laterally-manipulable with leftward (temporally backward) and rightward (temporally forward) swipe-type gestures on the touchscreen display of portable computing device 101A. User interface gesture conventions are matters of design choice, and other gestures may be employed to similar or complementary effect, if desired. In some embodiments, current position may also (or alternatively) be manipulated with gestures in pitch track 105A or lyrics 102A panes of the display. In each case, presentations of the on-screen elements (e.g., pitch track 105A, lyrics 102A, and audio envelope of the performance timeline) are visually synchronized such that forward or backward movement of one results in corresponding forward or backward movement of the other(s). If and when capture is started or restarted, each of the on-screen elements (e.g., pitch track 105A, lyrics 102A, and audio envelope of the performance timeline) roll forward in temporal correspondence from a coherent, visually synchronized starting point within the performance timeline. In embodiments or display modes that provide for performance-synchronized video, video roll or capture may optionally be initiated at the visually synchronized starting point within the performance timeline.

Figure 3:
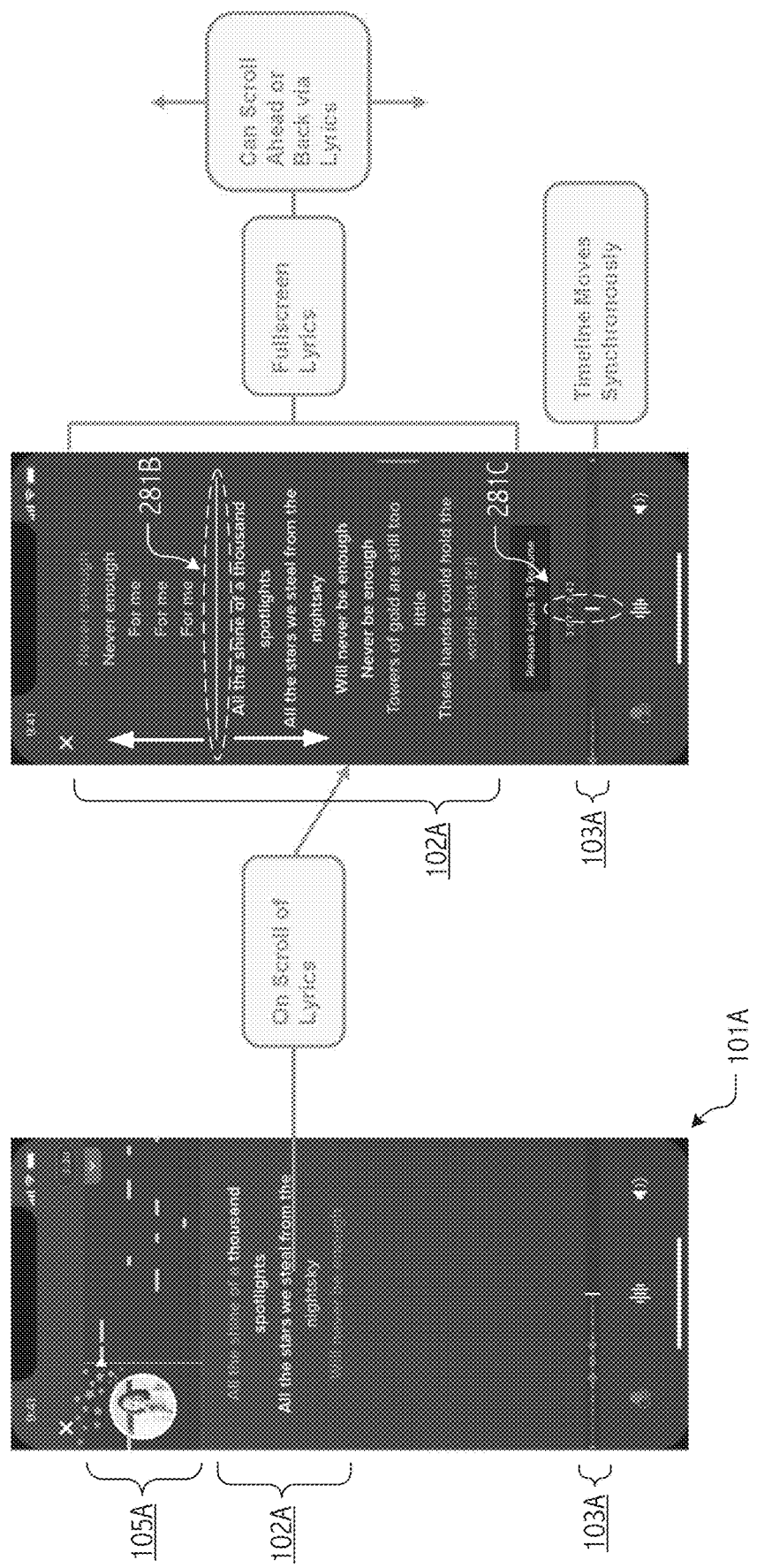
FIG. 3 illustrates an exemplary user interface in connection with a vocal capture scrolling behavior wherein a current point in the presentations of lyrics and the performance timeline moves forward or backward in correspondence with gestures by a user on a touchscreen of the portable computing device.

FIG. 3 illustrates another exemplary user interface mechanic in connection with a vocal capture scrolling behavior wherein a current point (281B) in the presentations of lyrics 102A and its corresponding point (281C) in the performance timeline moves forward or backward in correspondence with gestures by a user on a touchscreen of portable computing device 101A (recall FIG. 1). Although an expanded presentation of lyrics 102A is provided and pitch cues are hidden in the illustrated embodiment, other embodiments may allocate screen real estate differently. User interface gestures for forward and backward scrolling through lyrics are expressed by the user-vocalist in connection with the on-screen presentation of lyrics using upward or downward movement on the touchscreen of portable computing device 101A (recall FIG. 1). In some situations or embodiments, fine-grain (line-, word- or syllable-level) movement through the lyrics with visually synchronized traversal of other displayed features (e.g., audio envelope of scrubber 103A) may be a preferred mechanism for performance timeline traversal by a user vocalist during capture or recapture. As before, the touchscreen gestures provide synchronized movement through lyrics 102A and the performance timeline. Additional or alternative gesture expressions may be employed in some embodiments.

While exemplary user interface features emphasize lyrics and pitch cues, elements of musical structure such as segments, group parts, part NB in duet, etc. may also be used to mark points in a performance timeline to which a current position may be advanced or rewound. In some cases or embodiments, advance may be automated or scripted. In some cases, user interfaces may support a "seek" to next or previous point of musical structure significance, to a selected segment or location, or to a pre-marked/labeled segment boundary.

Figure 4:
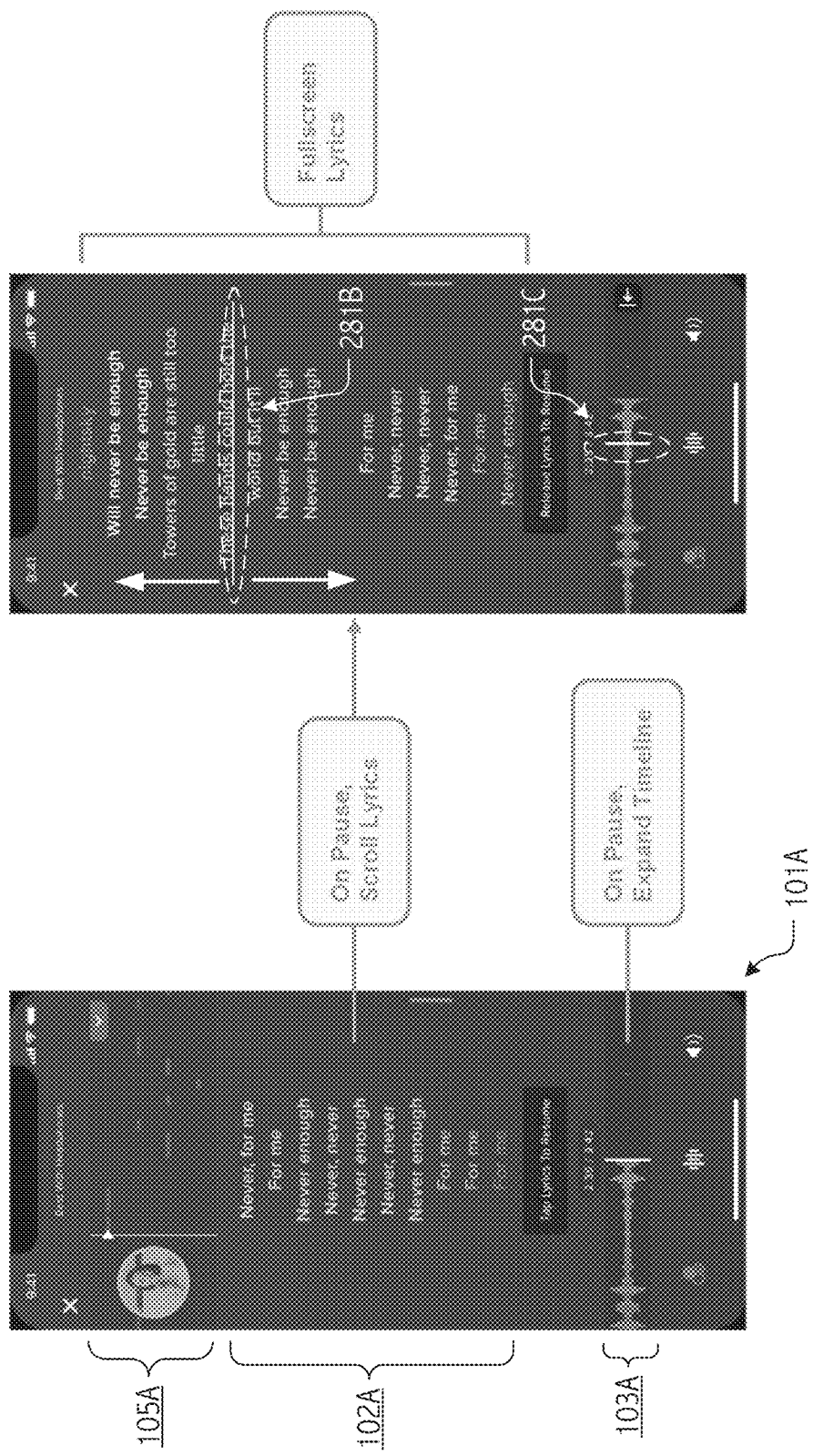
FIG. 4 illustrates an exemplary user interface in connection with a pause in vocal capture.

FIG. 4 illustrates similar user interface features in connection with a pause in vocal capture wherein a current point (281B) in the presentations of lyrics 102A and its corresponding point (281C) in the performance timeline moves forward or backward in correspondence with gestures by a user on a touchscreen of portable computing device 101A (recall FIG. 1). On pause, an expanded presentation of the performance timeline is presented in scrubber 103A. As before, a current point in the presentations of lyrics 102A and of timeline scrubber 103A moves forward or backward in correspondence with upward or downward touchscreen gestures by the user. Forward and backward movement through the features presented on screen (e.g., lyrics 102A and performance timeline) is temporally synchronized. User selections of lyrics may be employed to designate a vocal portion for subsequent joins and to seed media content (e.g., audio and/or video) for a collaboration request.

Figure 5:
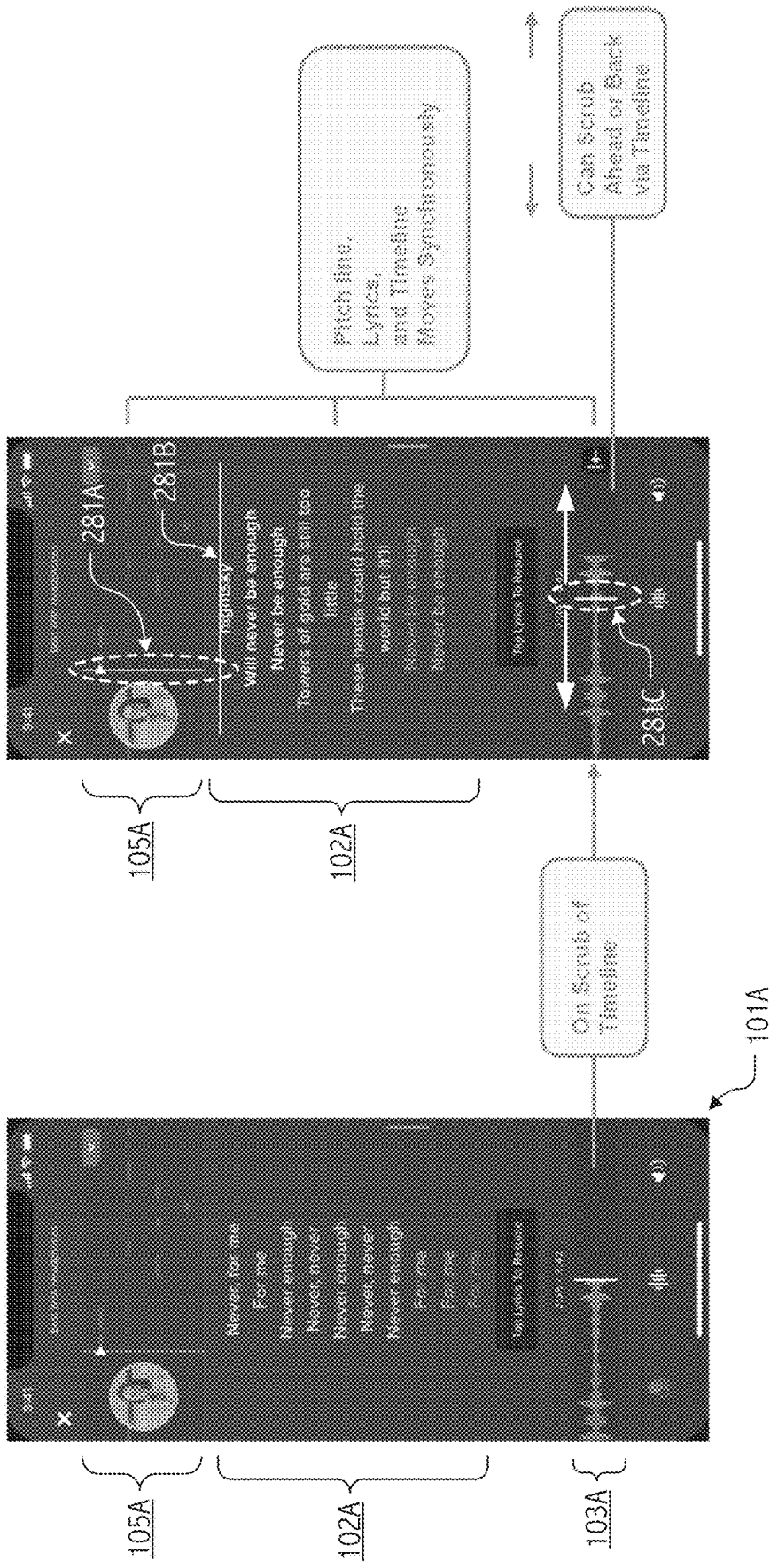
FIG. 5 illustrates another exemplary user interface with a scrubber to move forward or backward in correspondence with gestures by a user on a touchscreen of portable computing device.

FIG. 5 illustrates scrubbing using timeline scrubber 103A wherein a current point (281C) and its corresponding points (281B, 281A) in the presentations of lyrics 102A and pitch cues 105A move forward or backward in correspondence with gestures by a user on a touchscreen of portable computing device 101A (recall FIG. 1). The touchscreen gestures provide synchronized movement through lyrics 102A, pitch cues 105A and the performance timeline. Additional or alternative gesture expressions may be employed in some embodiments.

Figure 6:
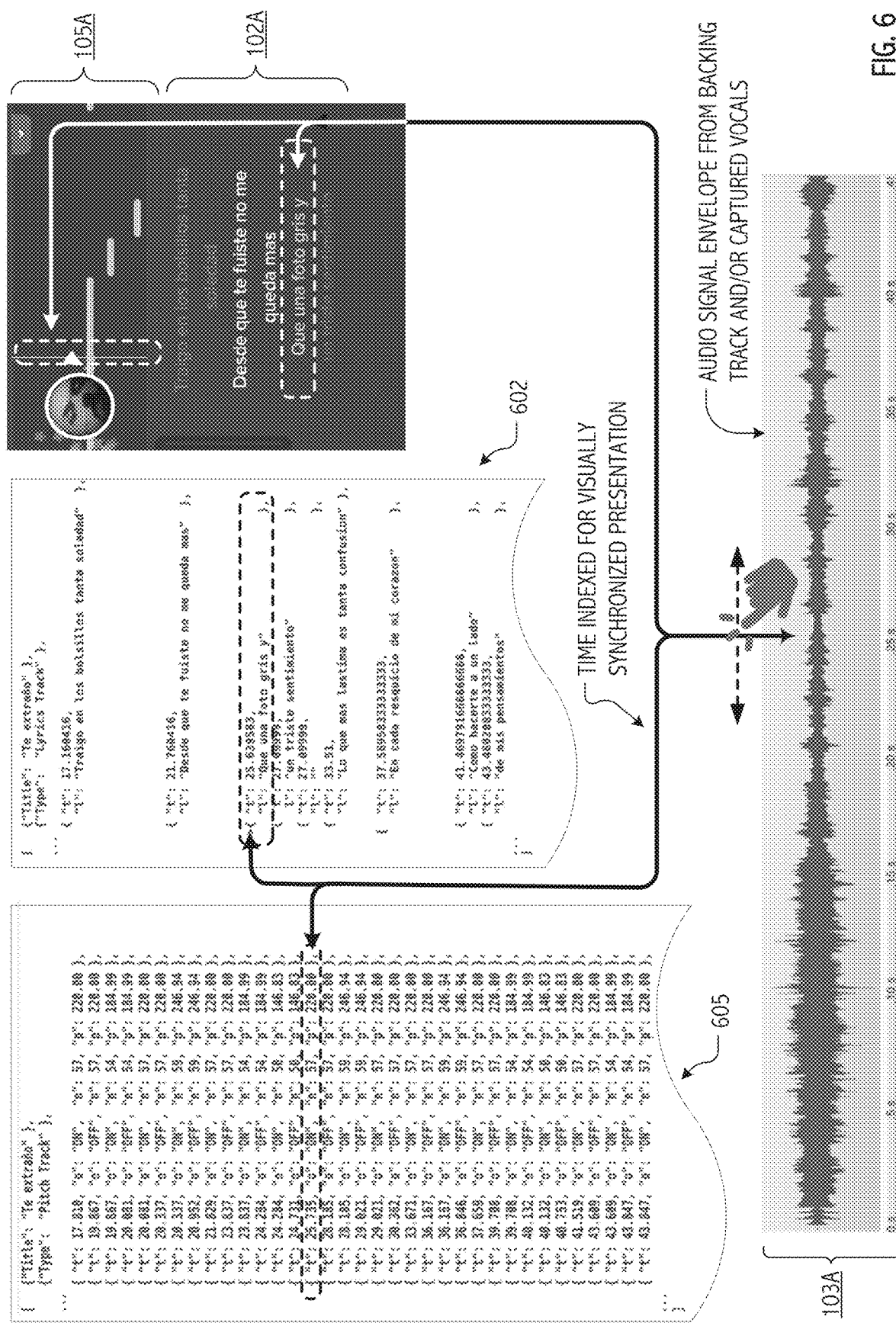
FIG. 6 illustrates a time-indexed traversal mechanism in accordance with some embodiments of the present inventions.

FIG. 6 illustrates time-indexed traversal of computer-readable encodings of pitch track 605 and lyrics track 602 data in connection with forward and backward user interface gestures expressed by a user on a touch screen display of an illustrative audio signal envelope computed from backing track and/or captured vocals. In general, MIDI, json or other suitable in-memory data representation formats may be employed for pitch, lyrics, musical structure and other information related to a given performance or musical arrangement. Persons of skill in the art having benefit of the present disclosure will appreciate use of any of a variety of data structure indexing techniques to facilitate visually synchronized presentation of a position in a performance timeline, e.g., using scrubber 103A, lyrics 102A and pitch cue 105A portions of a display.

Figure 7:
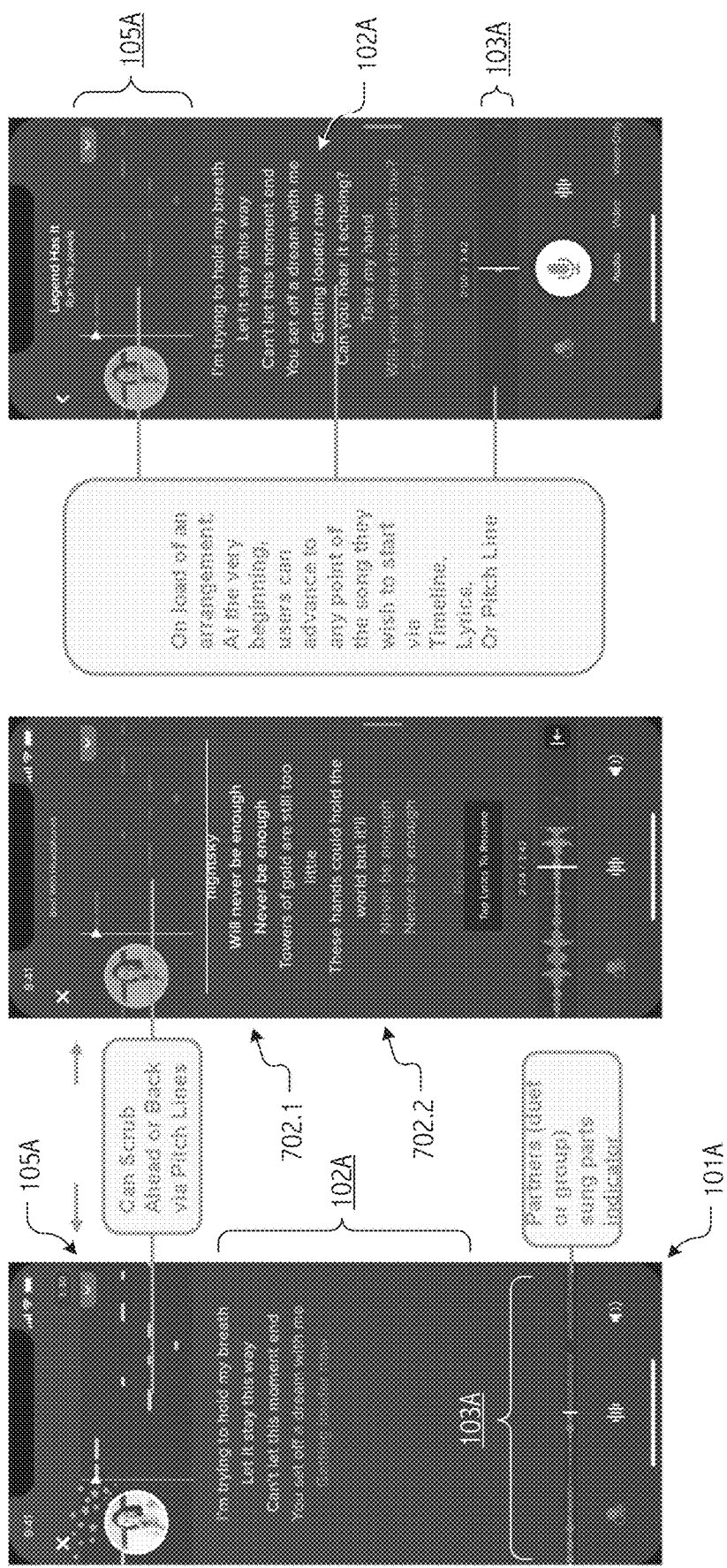
FIG. 7 illustrates some illustrative variations on the scrubbing mechanism(s) introduced with reference to some of the preceding drawings.

FIG. 7 illustrates some illustrative variations on the scrubbing mechanism(s) introduced with reference to the preceding drawings. Specifically, in one illustrated variation, scrubbing is alternatively (or additionally) supported based on side-to-side gestures in the pitch cue presentation portion (105A) of the touchscreen. As before, movement through lyrics (102A) and traversal of an audio signal envelope presentation of the performance timeline (103A) are visually synchronized with the pitch cue-based scrubbing. Vocal parts (e.g., lyrics 701.1, 702.2) for individual user vocalists may be notated in the performance timeline such as through an alternate color of other on-screen symbology. Similar symbology may be employed in pitch cue 105A and timeline scrubber 103A portions of the user interface to identify duet (Part A, Part B) or group parts sung or to-be-sung by individual vocalists. In some cases or embodiments, user interface facilities may be provided that advance/rewind to, or select, points of musical structure significance along the performance timeline. Examples include musical section boundaries, successive starts of a next Part A (or Part B) section in a duet, particular musical sections that have been assigned to a user vocalist as part of a collaboration request, etc. Upon loading a musical arrangement, user interfaces and scrubbing mechanisms in accordance with some embodiments of the present inventions allow users to advance/rewind to, or even select, an arbitrary or demarked point, section or segment in the arrangement for vocal, video and/or audiovisual capture, re-capture or playback using performance timeline, lyrics or pitch portions of the visually synchronized presentation.

Figure 8:
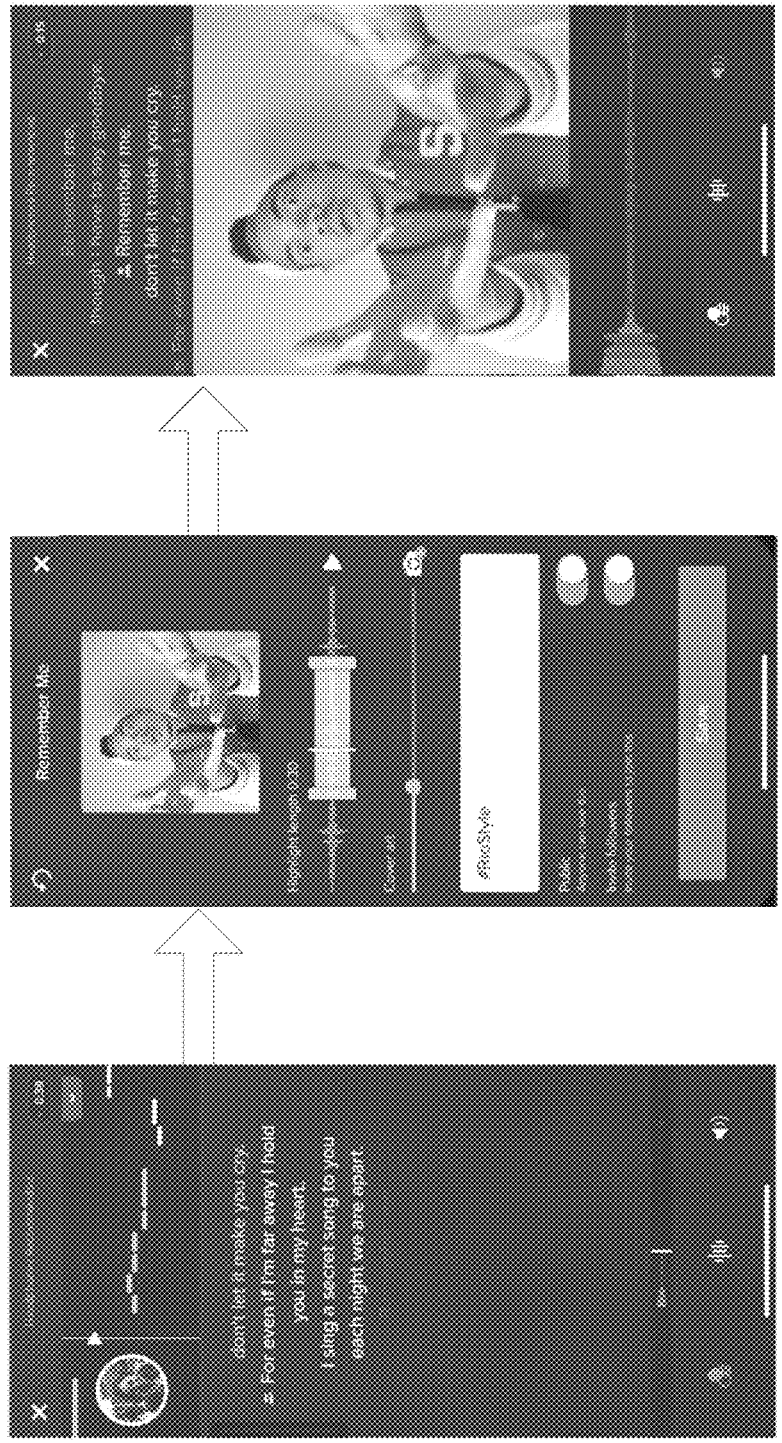
FIG. 8 illustrates use of a captured vocal performance as an audio seed, to which a user adds video, and finally updates a performance timeline to add or change a flow or a vocal part selection.
Figure 9:
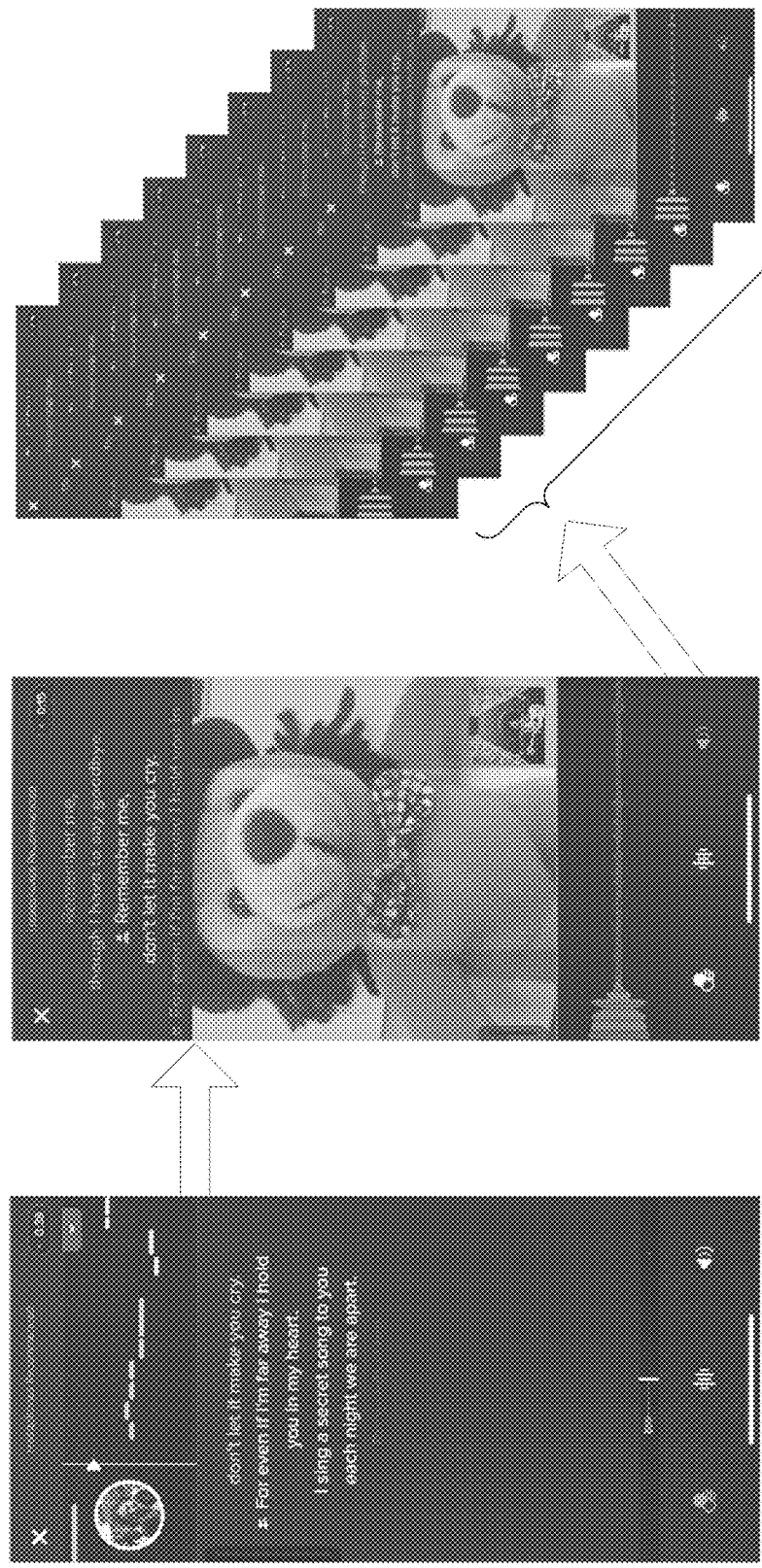
FIG. 9 depicts an illustrative sequence that includes an additional multi user collaboration aspect.

FIG. 8 illustrates use of a captured vocal performance as an audio seed, to which a user adds video, and finally updates a performance time to add or change a flow or a vocal part selection. FIG. 9 depicts an illustrative sequence that includes an additional multi user collaboration aspect. For example, after a first user (user A) captures a vocal performance as an audio seed, a second user (user B) joins user A' performance and adds audio and/or video media segments. In the illustrative sequence, user B also adds a vocal part designation, such as by notating particular lyrics as part B of a duet. From there, multiple potential joiners are invited (e.g., as part of an open call) to add additional media content to user A's initial audio seed with the added audio, video and in accordance with vocal part designation by user B.

Figure 10:
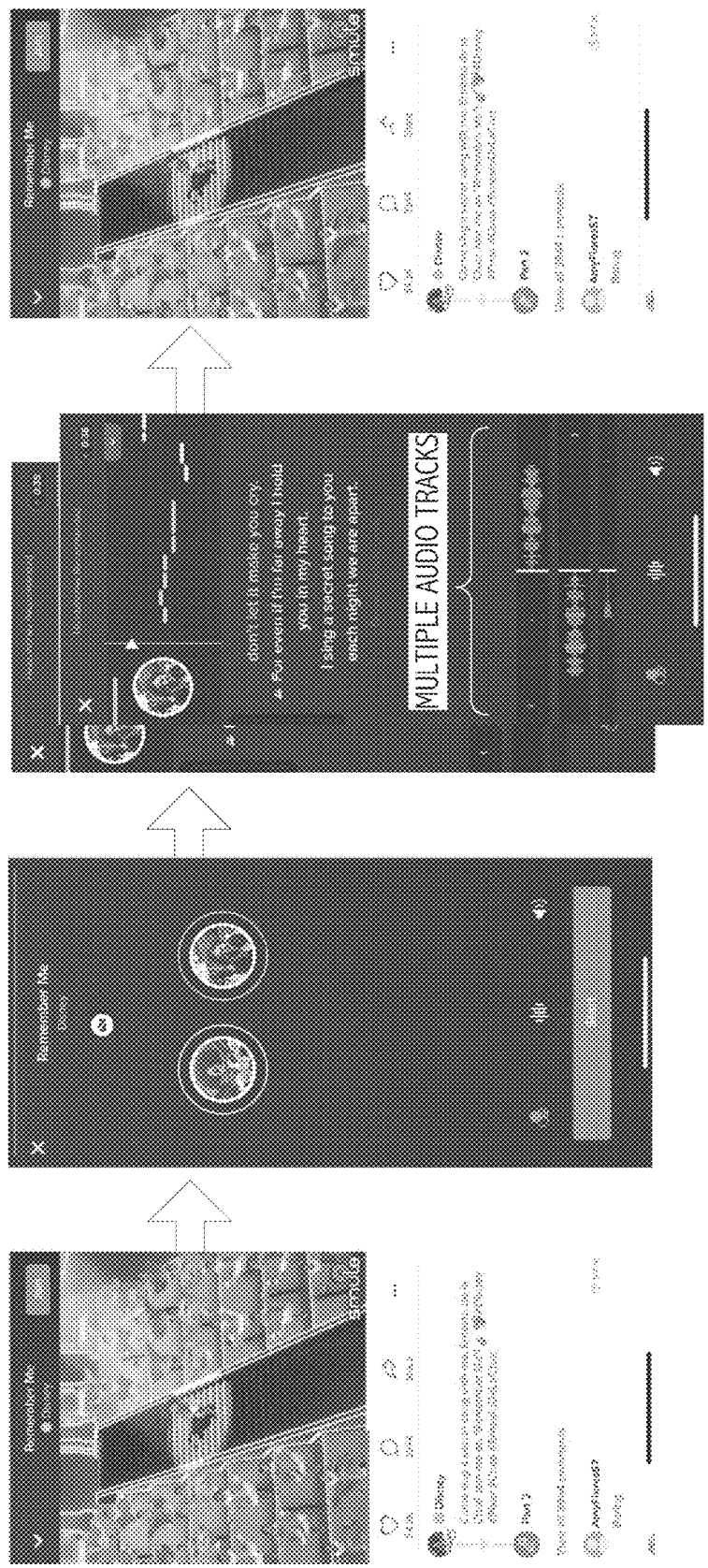
FIG. 10 depicts an illustrative sequence with multi-user collaboration involving video created or captured by a user as an initial seed performance.

FIG. 10 depicts a similar sequence with multi-user collaboration, but in which video created or captured by a first user (user A) is provided as an initial seed performance. A second user (user B) joins user A's video and adds an audio segment, here captured vocal audio. User A, in turn, invites users (e.g., user B and others) to add additional audio, here main audio (melody) and two additional vocal harmony parts. The result is video with multiple audio layers added as a collaboration.

Figure 11:
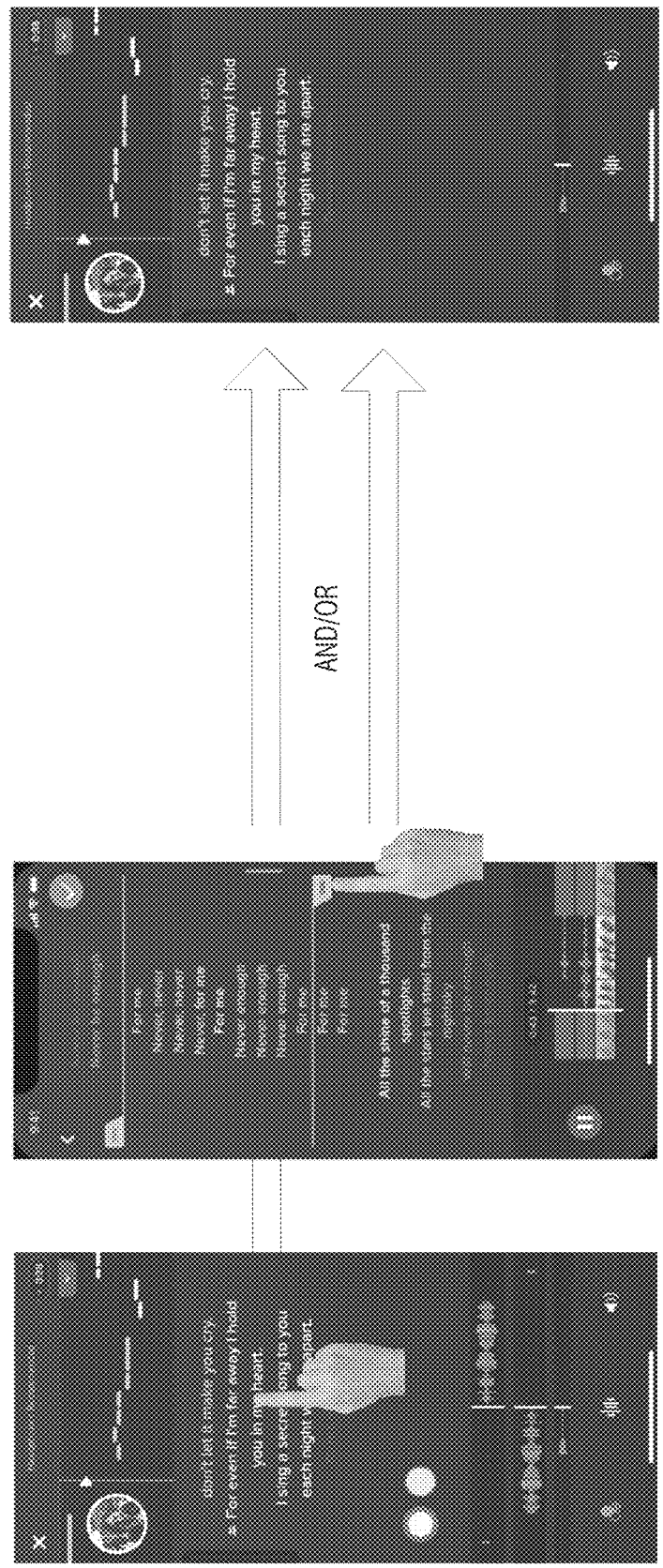
FIG. 11 depicts exemplary special invite options including user designation of a particular vocal part for which a joiner is guided to sing or provide audio.

FIG. 11 depicts certain exemplary special invite options including user designation of a particular vocal part for subsequent joins and user selection of lyrics to designate a vocal portion for subsequent joins to seed media content (e.g., audio and/or video). In each case, the joiner is guided to sing, or more generally to provide audio for, the designated vocal portion.

Figure 12:
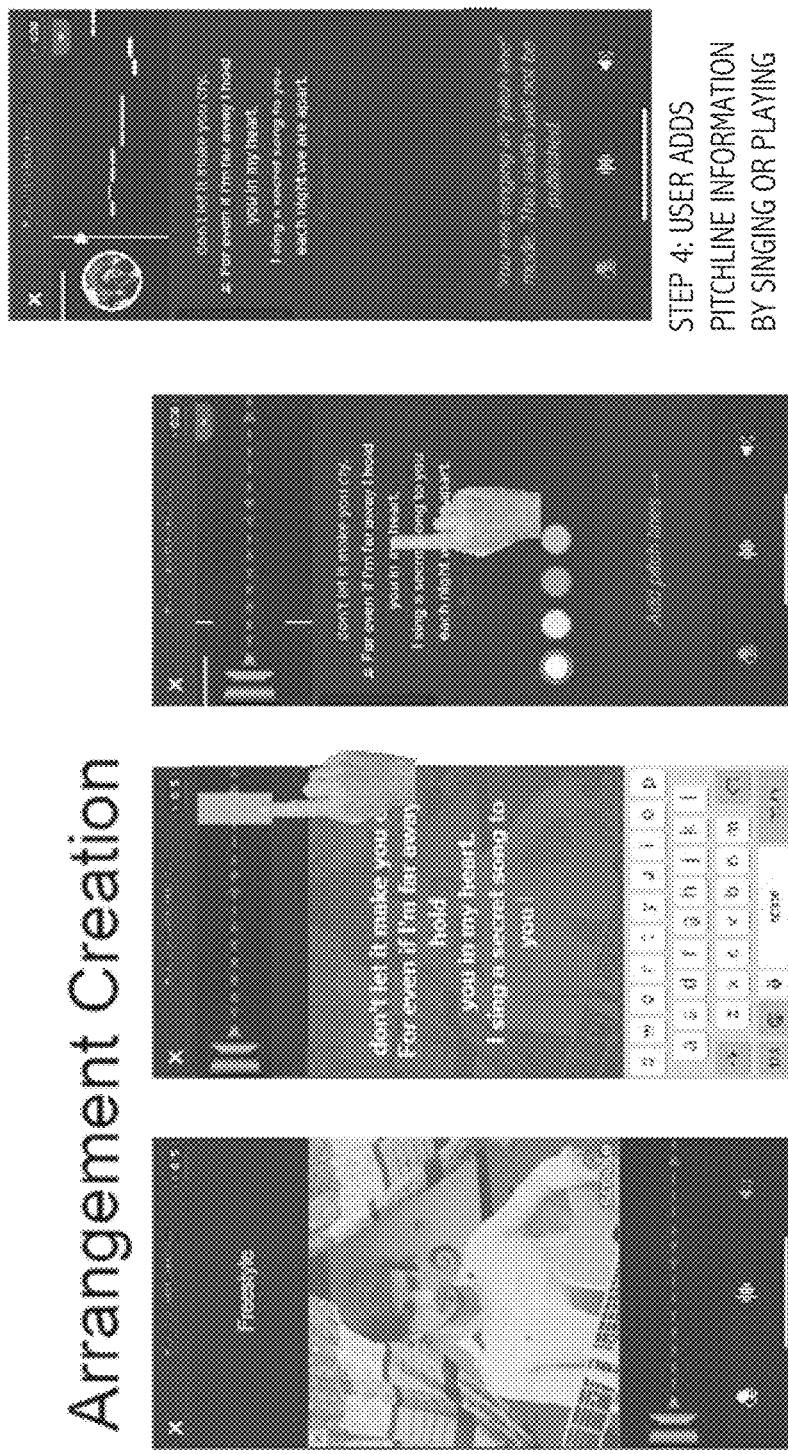
FIG. 12 depicts freestyle creation of an arrangement in accordance with some embodiments of the present invention(s).

Freeform and collaborative arrangement creation processes are also envisioned. For example, as illustrated in FIG. 12, STEP 1, a user (user A) may perform and capture a freestyle mode performance, e.g., acoustic audio with performance synchronized video of a guitar performance. User A's initial freeform capture provides an initial seed for further collaboration. Next (in one illustrative flow), a user (e.g., user A or another user B) may enter lyrics (STEP 2) to accompany the audiovisual performance. Timeline editing and scrubbing facilities described herein can be particularly helpful in entering, manipulating and aligning entered lyrics to desired points in the performance timeline. Next (in the illustrated flow), a user (user A, B or another user C) may assign (STEP 3) particular lyric portions to singers (e.g., part A vs. part B in duet). More generally, larger numbers of vocal parts may be assigned in a group arrangement.

An advanced feature of the freeform and collaborative arrangement creation process illustrated in FIG. 12, STEP 4, for at least some embodiments, is provision of a pitch line capture mechanism, whereby an audio track is captured against a karaoke-style roll of the evolving performance timeline and used to compute a pitch track. In general, any of a variety of pitch detection techniques may be applied to compute a pitch track from captured audio. Vocal audio and musical instrument audio (e.g., from a piano) are both envisioned. In each case, compute pitch tracks are added to the performance timeline. Note that the user-generated arrangement need not be limited to lyrics and pitch lines. As an example (see STEP 5+), the media segment capture and edit platform may be extended to allow a user (user A, B, C or still another user D) to designate things like: song part ("Chorus", "Verse", etc.), harmony part, segment-based video or audio effects/filters, etc. Note also that, while ordered flow of FIG. 12 is illustrative, other embodiments may vary ordering of steps, omit steps or include additional steps appropriate to a particular freeform collaboration and particular audio or audiovisual work.

Short Seed and Other Variations

Figure 13:
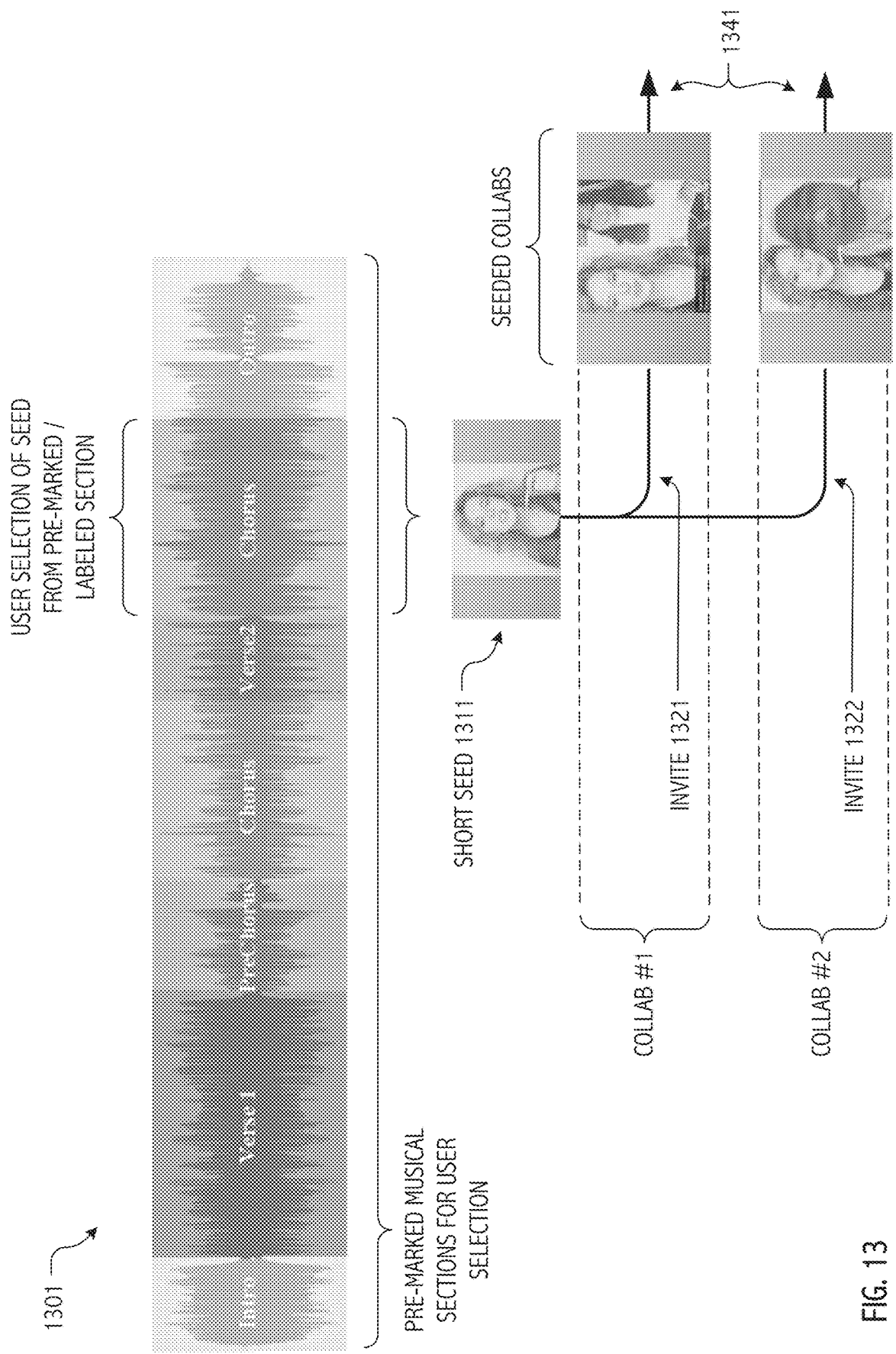
FIG. 13 illustrates a short seed collaboration flow in accordance with some embodiments of the present invention(s).

Though much of the foregoing description demonstrates the flexibility of non-linear segment capture and edit techniques in the context of full performance timelines, persons of skill in the art having benefit of the present disclosure will appreciate that collaboration seeds may, but need not, span a full audio (or audiovisual work). In some cases, a seed may be a full-length seed spanning much or all of a pre-existing audio (or audiovisual) work and mixing a seeding user's captured media content for at least some portions of the audio (or audiovisual) work. In some cases, a short seed may be employed that spans less than all (and in some cases, much less than all) of the audio (or audiovisual) work. For example (as illustrated in FIG. 13), a verse, chorus, refrain, hook or other limited "chunk" of an audio (or audiovisual) work may constitute the seed for subsequent joins. Pre-marked portions (here musical sections) of an audio or audiovisual work 1301 may be selected by the seeding user. The resulting short seed 1311 constitutes the seed for multiple collaborations (here collabs #1 and #2). Whatever its extent or scope, the seed or seed portion delimits the collaboration request (or call) for others to join. Typically, a call invites other users to join the full-length or short-form seed by singing along, singing a particular vocal part or musical section, singing harmony or other duet part, rapping, talking, clapping, recording video, adding a video clip from camera roll, etc. Invites 1321 and 1322 are illustrative in the short seed example of FIG. 13. The resulting group performance, whether full-length or just a chunk, may be posted, livestreamed, or otherwise disseminated (1341) in a social network.

A seed or seed portion may be selected by the seeding user using scrubbing techniques that allow forward and backward traversal of audiovisual content, optionally including pitch cues, waveform- or envelope-type performance timelines, lyrics, video and/or other temporally-synchronized content at record-time, during edits, and/or in playback. In this way, recapture of selected performance portions, coordination of group parts, and overdubbing may all be facilitated. Direct scrolling to arbitrary points in the performance timeline, lyrics, pitch cues and other temporally-synchronized content allows user to conveniently move through a capture or audiovisual edit session. For selections or embodiments that involve short seeds, scrubbing techniques may be employed to define start and stop points that delimit a particular seed portion or chunk. Likewise, in the case of full-length seeds, scrubbing techniques may be employed to define start and stop points that delimit portions of a performance timeline to which a joiner is invited to contribute.

In some cases, the user vocalist may be guided through the performance timeline, lyrics, pitch cues and other temporally-synchronized content in correspondence with group part information such as in a guided short-form capture for a duet. A scrubber allows user vocalists to conveniently move forward and backward through the temporally-synchronized content. In some cases, temporally synchronized video capture and/or playback is also supported in connection with the scrubber. Note that while scrubbing may be provided for synchronized traversal of multiple media lines (e.g., backing audio, vocals, lyrics, pitch cue and/or group part information), single-medium scrubbing is also envisioned.

Scrubbing techniques need not be employed in all cases or embodiments. Portions of a performance timeline (often portions that correspond to musical sections) may be marked and labelled for user selection. Marking/labeling may be based on human or automated sources. For example, particular portions may be marked or labelled by a user that originally uploads a track or corresponding lyrics or by a media content curator. In a complementary fashion or alternatively, particular portions may be marked or labelled by a machine learning robot trained to identify section and boundaries (e.g., from an audio backing or vocal track, lyrics or based on crowd-sourced data such as where user tend to sing the most or most loudly). These and other variations will be appreciated by persons of skill in the art having benefit of the present disclosure.

Exemplary Audiovisual Processing Flows, Devices and Systems

Figure 14:
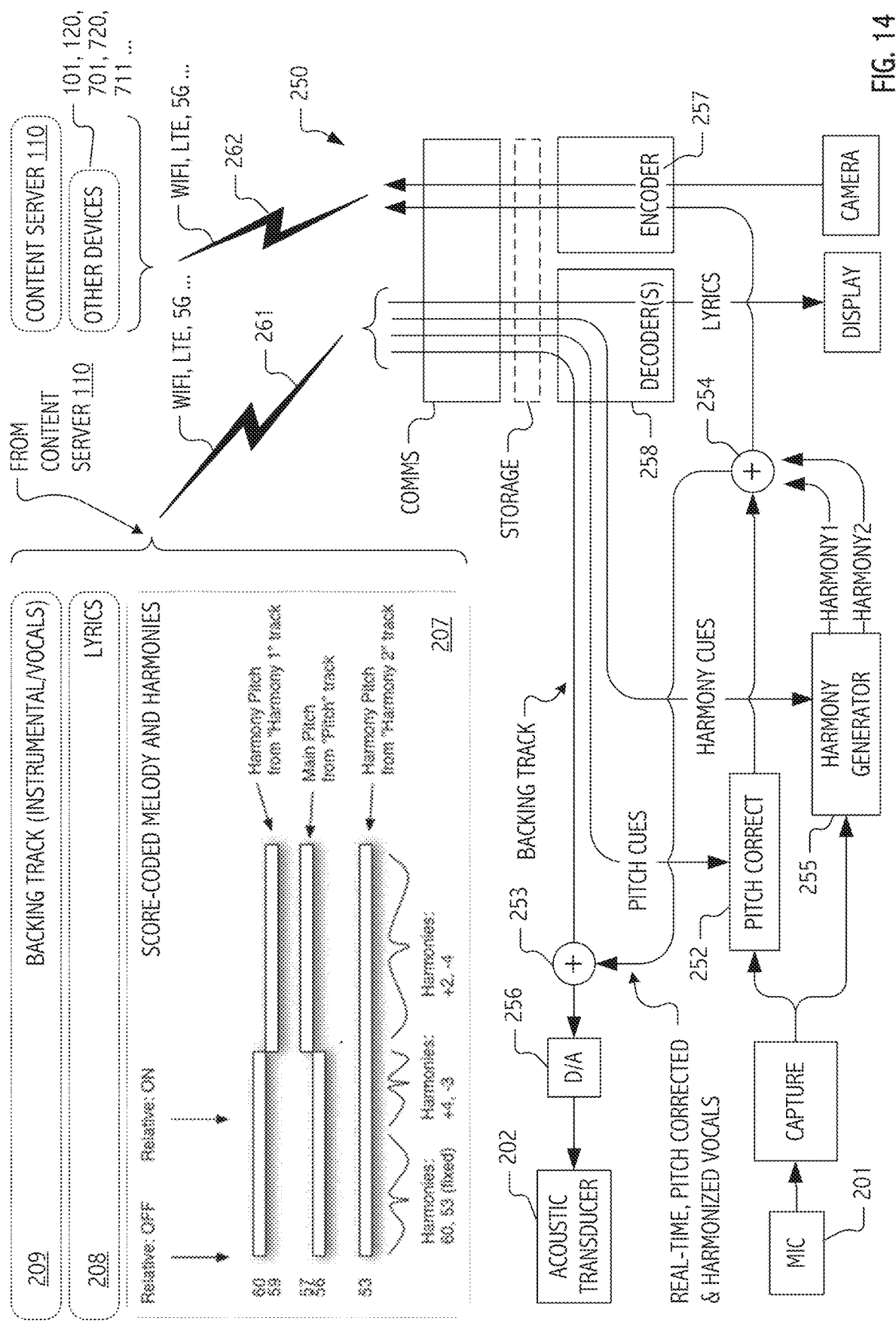
FIGS. 14 and 15 illustrate exemplary techniques for capture, coordination and/or mixing of audiovisual content.
Figure 15:
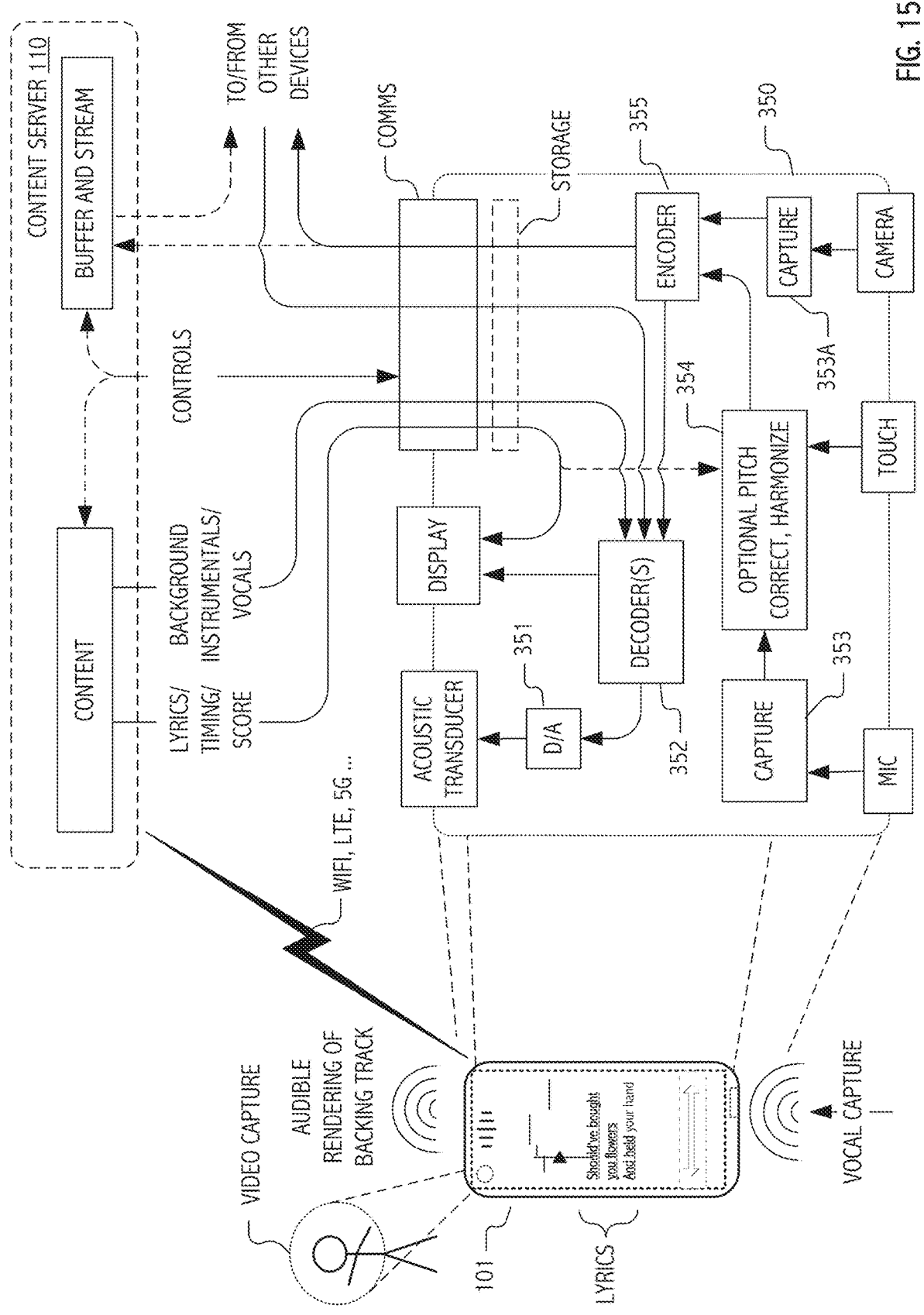

FIGS. 14 and 15 illustrate exemplary techniques for capture, coordination and/or mixing of audiovisual content for geographically distributed performers. Specifically, FIG. 14 is a flow diagram illustrating real-time continuous score-coded pitch-correction and harmony generation for a captured vocal performance in accordance with some embodiments of the present invention. In the illustrated configuration, a user/vocalist sings along with a backing track, karaoke style. Vocals captured (251) from a microphone input 201 are continuously pitch-corrected (252) and harmonized (255) in real-time for mix (253) with the backing track which is audibly rendered at one or more acoustic transducers 202.

Both pitch correction and added harmonies are chosen to correspond to a score 207, which in the illustrated configuration, is wirelessly communicated (261) to the device(s) (e.g., from content server 110 to handheld 101, recall FIG. 1, or set-top box equipment) on which vocal capture and pitch-correction is to be performed, together with lyrics 208 and an audio encoding of the backing track 209. In some embodiments of techniques described herein, the note (in a current scale or key) that is closest to that sounded by the user/vocalist is determined based on score 207. While this closest note may typically be a main pitch corresponding to the score-coded vocal melody, it need not be. Indeed, in some cases, the user/vocalist may intend to sing harmony and the sounded notes may more closely approximate a harmony track.

In some embodiments, capture of vocal audio and performance synchronized video may be performed using facilities of television-type display and/or set-top box equipment. However, in other embodiments, a handheld device (e.g., handheld device 301) may itself support capture of both vocal audio and performance synchronized video. Thus, FIG. 15 illustrates basic signal processing flows (350) in accord with certain implementations suitable for a mobile phone-type handheld device 301 to capture vocal audio and performance synchronized video, to generate pitch-corrected and optionally harmonized vocals for audible rendering (locally and/or at a remote target device), and to communicate with a content server or service platform 310.

Based on the description herein, persons of ordinary skill in the art will appreciate suitable allocations of signal processing techniques (sampling, filtering, decimation, etc.) and data representations to functional blocks (e.g., decoder(s) 352, digital-to-analog (D/A) converter 351, capture 353, 353A and encoder 355) of a software executable to provide signal processing flows 350 illustrated in FIG. 15. Likewise, relative to FIG. 14, the signal processing flows 250 and illustrative score coded note targets (including harmony note targets), persons of ordinary skill in the art will appreciate suitable allocations of signal processing techniques and data representations to functional blocks and signal processing constructs (e.g., decoder(s) 258, capture 251, digital-to-analog (D/A) converter 256, mixers 253, 254, and encoder 257) implemented at least in part as software executable on a handheld or other portable computing device.

As will be appreciated by persons of ordinary skill in the art, pitch-detection and pitch-correction have a rich technological history in the music and voice coding arts. Indeed, a wide variety of feature picking, time-domain and even frequency-domain techniques have been employed in the art and may be employed in some embodiments in accord with the present invention. In some embodiments in accordance with the present inventions, pitch-detection methods calculate an average magnitude difference function (AMDF) and execute logic to pick a peak that corresponds to an estimate of the pitch period. Building on such estimates, pitch shift overlap add (PSOLA) techniques are used to facilitate resampling of a waveform to produce a pitch-shifted variant while reducing aperiodic effects of a splice. Implementations based on AMDF/PSOLA techniques are described in greater detail in commonly-owned, U.S. Pat. No. 8,983,829, entitled "COORDINATING AND MIXING VOCALS CAPTURED FROM GEOGRAPHICALLY DISTRIBUTED PERFORMERS," and naming Cook, Lazier, Lieber, and Kirk as inventors.

Figure 16:
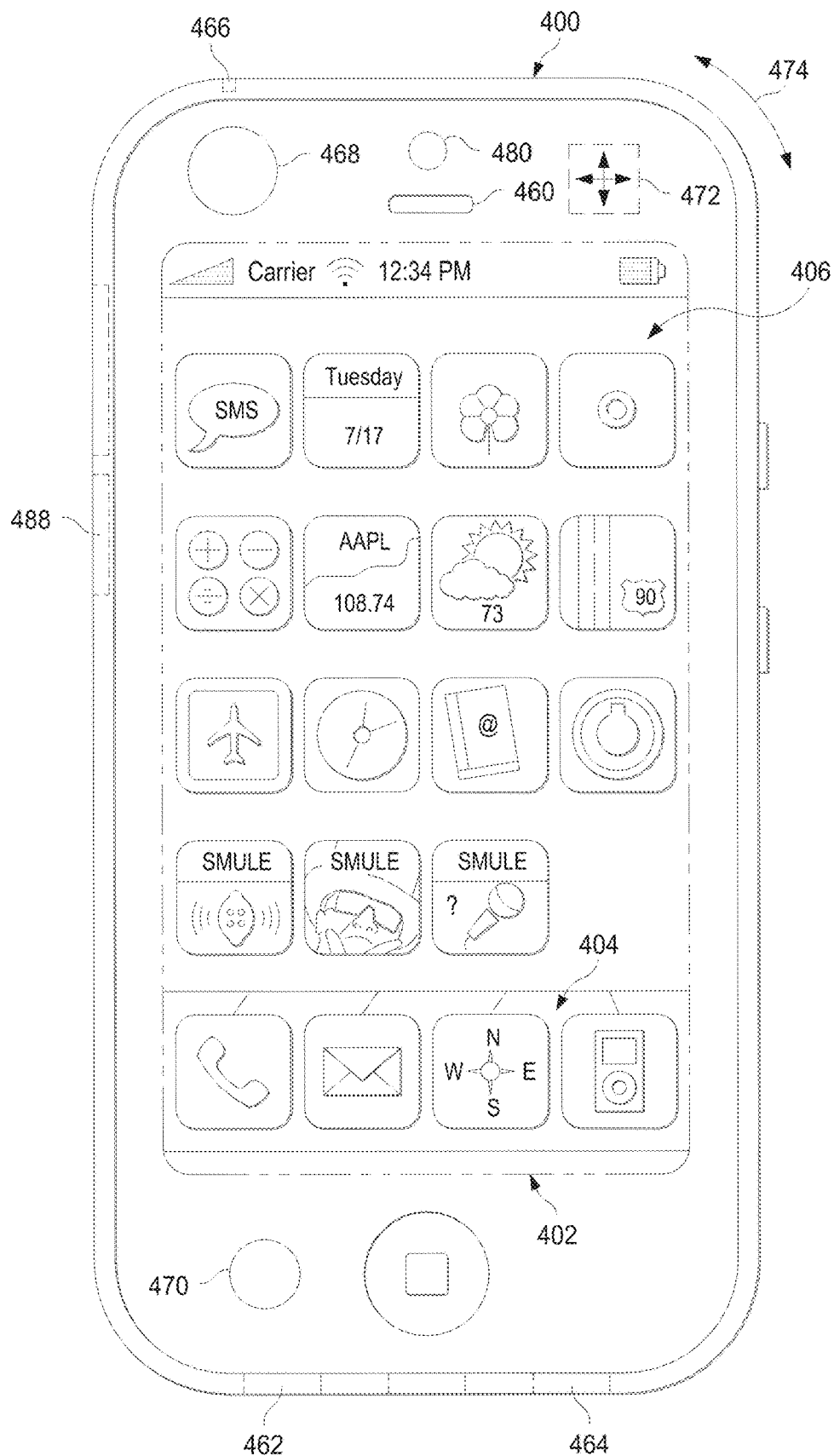
FIG. 16 illustrates features of a mobile phone type device that may serve as a platform for execution of software implementations in accordance with some embodiments of the present invention(s).

FIG. 16 illustrates features of a mobile device that may serve as a platform for execution of software implementations in accordance with some embodiments of the present invention. More specifically, FIG. 16 is a block diagram of a mobile device 400 that is generally consistent with commercially-available versions of an iPhone™ mobile digital device. Although embodiments of the present invention are certainly not limited to iPhone deployments or applications (or even to iPhone-type devices), the iPhone device platform, together with its rich complement of sensors, multimedia facilities, application programmer interfaces and wireless application delivery model, provides a highly capable platform on which to deploy certain implementations. Based on the description herein, persons of ordinary skill in the art will appreciate a wide range of additional mobile device platforms that may be suitable (now or hereafter) for a given implementation or deployment of the inventive techniques described herein.

Summarizing briefly, mobile device 400 includes a display 402 that can be sensitive to haptic and/or tactile contact with a user. Touch-sensitive display 402 can support multi-touch features, processing multiple simultaneous touch points, including processing data related to the pressure, degree and/or position of each touch point. Such processing facilitates gestures and interactions with multiple fingers and other interactions. Of course, other touch-sensitive display technologies can also be used, e.g., a display in which contact is made using a stylus or other pointing device.

Typically, mobile device 400 presents a graphical user interface on the touch-sensitive display 402, providing the user access to various system objects and for conveying information. In some implementations, the graphical user interface can include one or more display objects 404, 406. In the example shown, the display objects 404, 406, are graphic representations of system objects. Examples of system objects include device functions, applications, windows, files, alerts, events, or other identifiable system objects. In some embodiments of the present invention, applications, when executed, provide at least some of the digital acoustic functionality described herein.

Typically, the mobile device 400 supports network connectivity including, for example, both mobile radio and wireless internetworking functionality to enable the user to travel with the mobile device 400 and its associated network-enabled functions. In some cases, the mobile device 400 can interact with other devices in the vicinity (e.g., via Wi-Fi, Bluetooth, etc.). For example, mobile device 400 can be configured to interact with peers or a base station for one or more devices. As such, mobile device 400 may grant or deny network access to other wireless devices.

Mobile device 400 includes a variety of input/output (I/O) devices, sensors and transducers. For example, a speaker 460 and a microphone 462 are typically included to facilitate audio, such as the capture of vocal performances and audible rendering of backing tracks and mixed pitch-corrected vocal performances as described elsewhere herein. In some embodiments of the present invention, speaker 460 and microphone 662 may provide appropriate transducers for techniques described herein. An external speaker port 464 can be included to facilitate hands-free voice functionalities, such as speaker phone functions. An audio jack 466 can also be included for use of headphones and/or a microphone. In some embodiments, an external speaker and/or microphone may be used as a transducer for the techniques described herein.

Other sensors can also be used or provided. A proximity sensor 468 can be included to facilitate the detection of user positioning of mobile device 400. In some implementations, an ambient light sensor 470 can be utilized to facilitate adjusting brightness of the touch-sensitive display 402. An accelerometer 472 can be utilized to detect movement of mobile device 400, as indicated by the directional arrow 474. Accordingly, display objects and/or media can be presented according to a detected orientation, e.g., portrait or landscape. In some implementations, mobile device 400 may include circuitry and sensors for supporting a location determining capability, such as that provided by the global positioning system (GPS) or other positioning systems (e.g., systems using Wi-Fi access points, television signals, cellular grids, Uniform Resource Locators (URLs)) to facilitate geocodings described herein. Mobile device 400 also includes a camera lens and imaging sensor 480. In some implementations, instances of a camera lens and sensor 480 are located on front and back surfaces of the mobile device 400. The cameras allow capture still images and/or video for association with captured pitch-corrected vocals.

Mobile device 400 can also include one or more wireless communication subsystems, such as an 802.11b/g/n/ac communication device, and/or a Bluetooth™ communication device 488. Other communication protocols can also be supported, including other 802.x communication protocols (e.g., WiMax, Wi-Fi, 3G), fourth or fifth generation protocols and modulations (4G-LTE, 5G), code division multiple access (CDMA), global system for mobile communications (GSM), Enhanced Data GSM Environment (EDGE), etc. A port device 490, e.g., a Universal Serial Bus (USB) port, or a docking port, or some other wired port connection, can be included and used to establish a wired connection to other computing devices, such as other communication devices 400, network access devices, a personal computer, a printer, or other processing devices capable of receiving and/or transmitting data. Port device 490 may also allow mobile device 400 to synchronize with a host device using one or more protocols, such as, for example, the TCP/IP, HTTP, UDP and any other known protocol.

Figure 17:
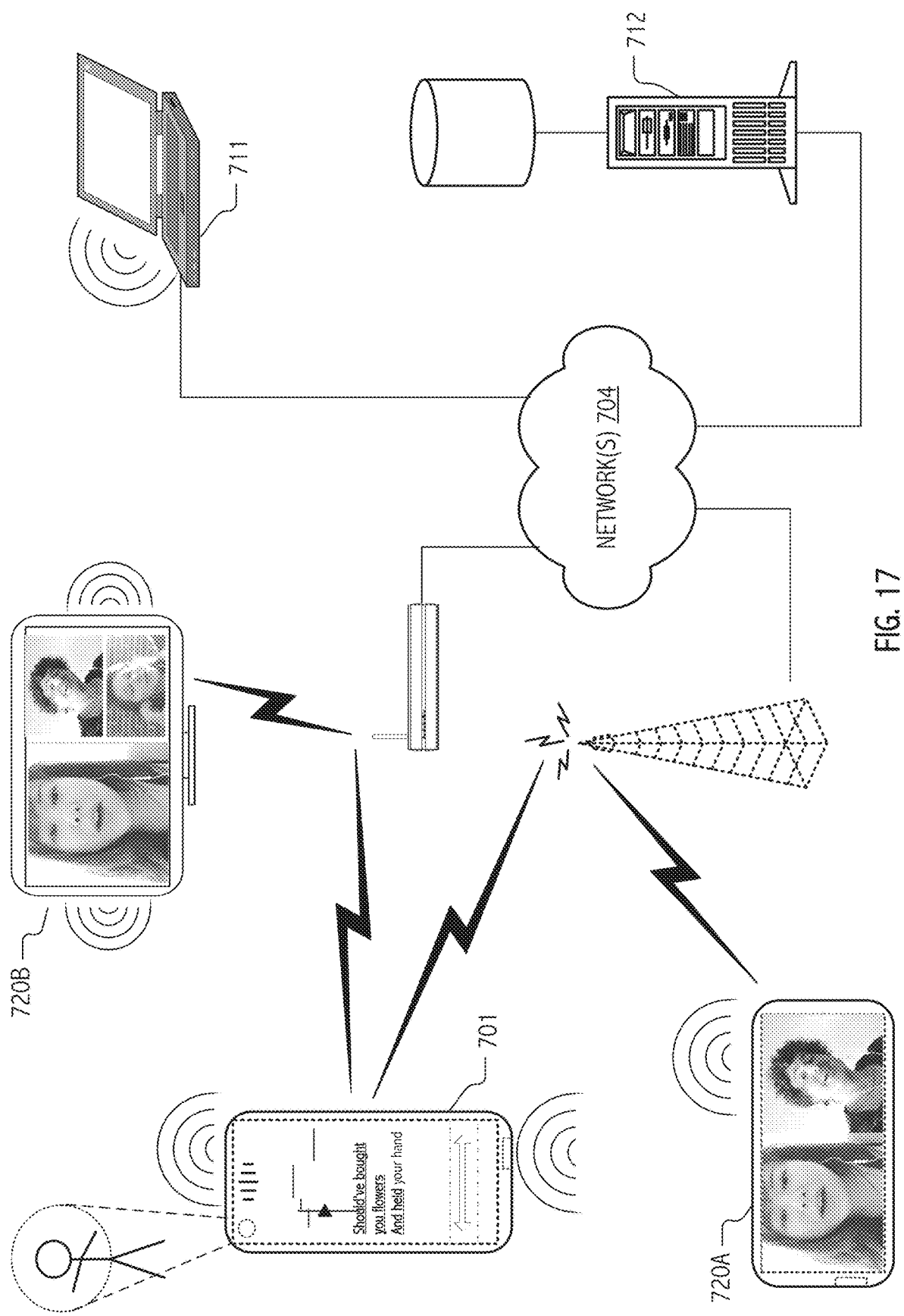
FIG. 17 illustrates a system in which devices and related service platforms may operate in accordance with some embodiments of the present invention(s).

FIG. 17 illustrates respective instances (501 and 520) of a portable computing device such as mobile device 400 programmed with vocal audio and video capture code, user interface code, pitch correction code, an audio rendering pipeline and playback code in accord with the functional descriptions herein. Device instance 501 is depicted operating in a vocal audio and performance synchronized video capture mode, while device instance 520 operates in a presentation or playback mode for a mixed audiovisual performance. A television-type display and/or set-top box equipment 520A is likewise depicted operating in a presentation or playback mode, although as described elsewhere herein, such equipment may also operate as part of a vocal audio and performance synchronized video capture facility. Each of the aforementioned devices communicate via wireless data transport and/or intervening networks 504 with a server 512 or service platform that hosts storage and/or functionality explained herein with regard to content server 110, 210. Captured, pitch-corrected vocal performances with performance synchronized video capture using techniques described herein may (optionally) be streamed and audio-visually rendered at laptop computer 511.

OTHER EMBODIMENTS

While the invention(s) is (are) described with reference to various embodiments, it will be understood that these embodiments are illustrative and that the scope of the invention(s) is not limited to them. Many variations, modifications, additions, and improvements are possible. For example, while pitch correction vocal performances captured in accord with a karaoke-style interface have been described, other variations will be appreciated. Furthermore, while certain illustrative signal processing techniques have been described in the context of certain illustrative applications, persons of ordinary skill in the art will recognize that it is straightforward to modify the described techniques to accommodate other suitable signal processing techniques and effects.

Embodiments in accordance with the present invention may take the form of, and/or be provided as, a computer program product encoded in a machine-readable medium as instruction sequences and other functional constructs of software, which may in turn be executed in a computational system (such as a iPhone handheld, mobile or portable computing device, media application platform, set-top box, or content server platform) to perform methods described herein. In general, a machine readable medium can include tangible articles that encode information in a form (e.g., as applications, source or object code, functionally descriptive information, etc.) readable by a machine (e.g., a computer, computational facilities of a mobile or portable computing device, media device or streamer, etc.) as well as non-transitory storage incident to transmission of the information. A machine-readable medium may include, but need not be limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A system comprising:
    first and second media capture devices communicatively coupled via respective network communication interfaces for multi-performer collaboration relative to a baseline media encoding of an audio work;
    the first media capture device providing a first user thereof with a user interface for selecting a seed portion of the audio work and configured to capture at least vocal audio of the first user performed against an audible rendering on the first media capture device of at least a portion of the audio work, the user interface further allowing the first user to specify one or more types of media content to be captured at the second media capture device against a further audible rendering of the seed portion mixed with the captured vocal audio of the first user, wherein the specified one or more types of media content to be captured are selected from a set that includes vocal audio, vocal harmony or a vocal duet part; rap, talk, clap or percussion; and video; and the second media capture device configured (i) to receive, via its network communications interface, an indication of the seed portion selected by the first user at the first media capture device and (ii) to capture media content of a second user performed against an audible rendering on the second media capture device of the seed portion mixed with the captured vocal audio of the first user.

2. The system of claim 1,
wherein the user interface of the first media capture device further allows the first user to post the seed portion to other geographically-distributed users, including the second user, and media capture devices as a collaboration request for capture and addition of further vocal audio, video or performance synchronized audiovisual content.

3. The system of claim 1, further comprising:
a service platform communicatively coupled to the first and second media capture devices, the service platform configured to supply, for audible or audiovisual rendering on at least a third communicatively coupled device, a media encoding of a multi-performer collaboration of at least the first and second users based on the audio work but temporally limited to the seed portion thereof selected by the first user.

4. The system of claim 1, further comprising:
on the first media capture device, a user interface by which the first user selects the seed portion from amongst pre-marked or labeled portions of the audio work.

5. The system of claim 4, wherein the pre-marked or labeled portions of the audio work are supplied by a service platform communicatively coupled to the first and second media capture devices, the pre-marked or labeled portions having been marked or labelled based on one or more of:
a machine learning algorithm applied to backing audio, vocal audio or lyrics of or corresponding to the audio work; and
crowd-sourced data.

6. The system of claim 1,
wherein the baseline media encoding of the audio work further encodes synchronized video content.

7. The system of claim 1,
wherein the first media capture device is further configured to capture performance synchronized video content.

8. The system of claim 1,
wherein the first and second media capture device are mobile phone-type portable computing devices executing application software that, in at least one operating mode thereof, provide a karaoke-style presentation of a performance timeline including lyrics on a multi-touch sensitive display thereof in temporal correspondence with audible rendering of the audio work and that captures the respective first or second user's vocal and/or performance synchronized video via on-board audio and video interfaces the respective mobile phone-type portable computing device.

9. The system of claim 5, wherein at least some of the pre-marked or labeled portions of the audio work have been marked or labelled based on either or both of:
musical structure coded for the audio work; and
data supplied by a user uploader of the audio work or by a third-party curator thereof.

10. A system comprising:
first and second media capture devices communicatively coupled via respective network communication interfaces for multi-performer collaboration relative to a baseline media encoding of an audio work;
the first media capture device providing a first user thereof with a user interface for selecting a seed portion of the audio work and configured to capture at least vocal audio of the first user performed against an audible rendering on the first media capture device of at least a portion of the audio work and, on the first media capture device, a media content scrubber by which the first user notates start and stop points in a performance timeline to delimit and thereby select the seed portion; and
the second media capture device configured (i) to receive, via its network communications interface, an indication of the seed portion selected by the first user at the first media capture device and (ii) to capture media content of a second user performed against an audible rendering on the second media capture device of the seed portion mixed with the captured vocal audio of the first user.

11. The system of claim 10, wherein the media content scrubber presents to the first user a temporally-synchronized representation of two or more of:
audio envelope for backing audio and/or vocals;
lyrics;
one or more pitch tracks; and
duet or other group part notations.

12. A method comprising:
using a portable computing device for media segment capture in connection with karaoke-style presentation of a performance timeline on a multi-touch sensitive display thereof, the performance timeline including lyric and pitch tracks synchronized with an audio track, wherein the portable computing device is configured with user interface components executable to provide (i) start/stop control of the media segment capture and (ii) a scrubbing interaction for temporal position control within the performance timeline;
responsive to gesture control on the multi-touch sensitive display, designating a subset of the lyrics to a joiner;
adding at least one media segment to the performance timeline beginning at a scrubbed-to first position in the performance timeline that is neither the beginning thereof nor a most recent stop or pause position within the performance timeline; and
posting the performance timeline, with the lyrics subset designation, as a collaboration request for capture and addition of further vocal audio content by a joining remote user on a second, remote portable computing device that is configured for further media segment capture in connection with the performance timeline.

13. The method of claim 12, further comprising:
capturing vocal audio at the portable computing device beginning at the scrubbed-to first position in the performance timeline and in correspondence with the karaoke-style presentation of at least the synchronized lyric and pitch tracks on the multi-touch sensitive display, wherein the added at least one media segment includes the captured vocal audio.

14. The method of claim 12, wherein the added at least one media segment includes one or more of:
video or still images;
video captured at the portable computing device beginning at the scrubbed-to first position in the performance timeline and in correspondence with the karaoke-style presentation of the lyric and pitch tracks on the multi-touch sensitive display and synchronized audible rendering of the audio track; and
performance synchronized audio and visual media content captured at the portable computing device.

15. The method of claim 12 further comprising:
saving the performance timeline, including the added at least one media segment, to a network-coupled service platform.

16. The method of claim 12, further comprising:
retrieving a previously saved version of the performance timeline from a network-coupled service platform.

17. The method of claim 12,
wherein the posting of the performance timeline for the joining remote user is via a network-coupled service platform.

18. The method of claim 12,
wherein the lyrics subset designation is responsive to a first user gesture control on the multi-touch sensitive display that selects a particular vocal part for the joiner.

19. The method of claim 12,
wherein the lyrics subset designation is responsive to a second user gesture control on the multi-touch sensitive display that delimits the subset of the lyrics that correspond to the joiner's further media segment.

20. A method comprising:
using a first portable computing device for media segment capture in connection with karaoke-style presentation of a performance timeline on a multi-touch sensitive display thereof, the performance timeline including lyric and pitch tracks synchronized with an audio track, wherein the first portable computing device is configured with user interface components executable to provide (i) start/stop control of the media segment capture and (ii) a scrubbing interaction for temporal position control within the performance timeline; and
capturing at least one vocal audio media segment beginning at a scrubbed-to first position in the performance timeline that is neither the beginning thereof nor a most recent stop or pause position within the performance timeline,
wherein the performance timeline includes a subset of the lyrics designated by a prior user on a second remote computing device, the lyric subset designation at least partially parameterizing a collaboration request for capture and addition of further vocal audio content by a performance timeline-joining user on the first portable computing device.

21. The method of claim 20, further comprising:
updating the performance timeline to include the captured at least one vocal audio media segment; and
posting of the updated performance timeline via a network-coupled service platform for a joining remote user.

22. The method of claim 20,
wherein the lyrics subset designation is selective for a particular vocal part.

23. The method of claim 20,
wherein the lyrics subset designation delimits a subset of the lyrics for the performance timeline-joining user's further vocal audio content.

24. A method comprising:
using a portable computing device for capture of media content for a karaoke-style presentation of synchronized lyric, pitch and audio tracks;
capturing at least one audio segment using the portable computing device on a multi-touch sensitive display thereof, the portable computing device configured with user interface components executable to provide (i) start/stop control of the media segment capture and (ii) a scrubbing interaction for temporal position control within a performance timeline;
entering one or more segments of the lyrics and aligning the entered lyric segments to the performance timeline in response to gesture controls on the multi-touch sensitive display;
responsive to further gesture control on the multi-touch sensitive display moving forward or backward through a visually synchronized presentation, on the multi-touch sensitive display, of the performance timeline; and
after the moving, capturing at least one audio segment and pitch detecting the captured audio segment to produce at least a portion of the pitch track.

25. The method of claim 24,
wherein the capture of at least one audio segment is freestyle, without roll of the lyrics or pitch tracks.

26. The method of claim 25,
wherein the captured freestyle audio segment includes performance synchronized video.

27. The method of claim 25, wherein the captured freestyle audio segment includes either or both of:
instrumental backing audio; and
vocal audio.

28. The method of claim 24, further comprising:
responsive to still further gesture control on the multi-touch sensitive display moving forward or backward through a visually synchronized presentation, on the multi-touch sensitive display, of the performance timeline; and
after the moving, designating a subset of the lyrics to first vocal part.

29. The method of claim 24, further comprising:
posting the performance timeline as a collaboration request for capture and addition of vocal audio content by one or more vocalists at remote portable computing devices.

* * * * *